United States Patent
Ichikawa et al.

(10) Patent No.: US 10,388,450 B2
(45) Date of Patent: Aug. 20, 2019

(54) INDUCTOR MODULE AND ELECTRIC POWER TRANSMISSION SYSTEM

(71) Applicant: MURATA MANUFACTURING CO., LTD., Kyoto-fu (JP)

(72) Inventors: Keiichi Ichikawa, Nagaokakyo (JP); Tsuyoshi Suesada, Nagaokakyo (JP); Kentaro Mikawa, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 60 days.

(21) Appl. No.: 15/715,391

(22) Filed: Sep. 26, 2017

(65) Prior Publication Data

US 2018/0019053 A1    Jan. 18, 2018

Related U.S. Application Data

(63) Continuation of application No. PCT/JP2016/063951, filed on May 11, 2016.

(30) Foreign Application Priority Data

May 28, 2015   (JP) ................................. 2015-108392

(51) Int. Cl.
  *H01F 27/42* (2006.01)
  *H01F 27/28* (2006.01)
  (Continued)

(52) U.S. Cl.
  CPC ....... *H01F 27/2804* (2013.01); *H01F 27/245* (2013.01); *H01F 38/14* (2013.01);
  (Continued)

(58) Field of Classification Search
  None
  See application file for complete search history.

(56) References Cited

U.S. PATENT DOCUMENTS

2015/0028689 A1*  1/2015  Arisawa ................. G01V 3/101
                                                                    307/104
2018/0019053 A1*  1/2018  Ichikawa ................ H01F 38/30

FOREIGN PATENT DOCUMENTS

JP       H03-084905 A      4/1991
JP       2001-289885 A    10/2001
(Continued)

OTHER PUBLICATIONS

International Search Report issued in PCT/JP2016/063951; dated Jul. 26, 2016.

(Continued)

*Primary Examiner* — Lincoln D Donovan
*Assistant Examiner* — Khareem E Almo
(74) *Attorney, Agent, or Firm* — Studebaker & Brackett PC

(57) ABSTRACT

An inductor module includes a laminate where multiple insulator layers are laminated, a main line conductor in the shape of a straight line formed on the laminate, a current detection conductor that is formed on the laminate and magnetically coupled with the main line conductor, and coil conductors that are formed on the laminate and constitute an inductor element. An absolute value of a coupling coefficient between the main line conductor and inductor element, and an absolute value of a coupling coefficient between the current detection conductor and the inductor element, are each smaller than an absolute value of a coupling coefficient between the main line conductor and the current detection conductor. Thus, an inductor module that detects current and is used as an inductor element, and an electric power transmission system including the inductor module, are provided.

11 Claims, 35 Drawing Sheets

(51) Int. Cl.
*H01F 38/30* (2006.01)
*H02J 50/10* (2016.01)
*H01F 27/245* (2006.01)
*H01F 38/14* (2006.01)

(52) U.S. Cl.
CPC .............. *H01F 38/30* (2013.01); *H02J 50/10* (2016.02); *H01F 2027/2809* (2013.01)

(56) References Cited

FOREIGN PATENT DOCUMENTS

| | | | |
|---|---|---|---|
| JP | 2004-257964 A | | 9/2004 |
| JP | 2008-014644 A | | 1/2008 |
| JP | 2008-101914 A | | 5/2008 |
| JP | 2009-147253 | * | 7/2009 |
| JP | 2009-147253 A | | 7/2009 |
| WO | 2013/125610 A1 | | 8/2013 |

OTHER PUBLICATIONS

Written Opinion issued in PCT/JP2016/063951; dated Jul. 26, 2016.

* cited by examiner

INDUCTOR MODULE AND ELECTRIC POWER TRANSMISSION SYSTEM

CROSS REFERENCE TO RELATED APPLICATIONS

This application claims benefit of priority to Japanese Patent Application 2015-108392 filed May 28, 2015, and to International Patent Application No. PCT/JP2016/063951 filed May 11, 2016, the entire content of which is incorporated herein by reference.

TECHNICAL FIELD

The present disclosure relates to an inductor module including a current detection element and inductor element, and an electric power transmission system.

BACKGROUND

A known example of an element that detects current flowing through a line is a current transformer. A current transformer is usually configured as a transformer where wire is wound on a toroidal core. This results in the size of a component being large, and there are cases where it is difficult to use a current transformer in devices where a smaller size and lower height are desired. An example of a small and thin transformer is a laminated transformer described in Japanese Unexamined Patent Application Publication No. 2004-257964, for example. The laminated transformer described in Japanese Unexamined Patent Application Publication No. 2004-257964 is a surface-mounted electronic component formed by laminating magnetic sheets on which conductor patterns are printed, to configure a transformer.

SUMMARY

Technical Problem

The laminated transformer described in Japanese Unexamined Patent Application Publication No. 2004-257964 enables reduction in the size of a device including a transformer to be realized. However, reduction in the size of the device reduces the distance among elements within the device, and in a case where a magnetic-coupling element, such as an inductor element, for example, is disposed close to the laminated transformer described in Japanese Unexamined Patent Application Publication No. 2004-257964, the transformer and inductor element may be magnetically coupled, which may cause malfunctioning.

In light of this problem, it is an object of the present disclosure to provide an inductor module that detects current and also can be used as an inductor element, and to provide an electric power transmission system including the inductor module.

Solution to Problem

An inductor module according to the present disclosure includes a current detection coil conductor that is magnetically coupled with a main line conductor, and an inductor element coil conductor. An absolute value of a coupling coefficient between the main line conductor and the inductor element coil conductor, and an absolute value of a coupling coefficient between the current detection coil conductor and the inductor element coil conductor, are each smaller than an absolute value of a coupling coefficient between the main line conductor and the current detection coil conductor.

According to this configuration, when current flows through the main line conductor, magnetic flux is generated from the main line conductor, and this magnetic flux is interlinked with the current detection coil conductor, thereby generating induced electromotive force in the current detection coil conductor, and induced current flows. Current flowing through the main line conductor can be detected by detecting this induced electromotive force or induced current. Even if magnetic flux is generated from the main line conductor, magnetic coupling between the inductor element coil conductor and the main line conductor is weak. Magnetic coupling between the current detection coil conductor and the inductor element coil conductor also is weak. Accordingly, the inductor element coil conductor can be used as an inductor element independent from the main line conductor and current detection coil conductor.

In the inductor module according to the present disclosure, a configuration may be made where the main line conductor has a main portion in a shape extending in a straight line, and the current detection coil conductor has a winding axis along a circumferential direction or a straight line that is tangent to the circumferential direction with respect to a direction in which the main portion of the main line conductor extends as an axial direction.

According to this configuration, the current detection coil conductor and main line conductor can be strongly coupled.

In the inductor module according to the present disclosure, a configuration may be made where the inductor element coil conductor has a winding axis in the axial direction or a radial direction with respect to a direction in which the main portion of the main line conductor extends as an axial direction.

According to this configuration, the inductor element coil conductor can be kept from coupling with the main line conductor.

In the inductor module according to the present disclosure, a configuration may be made where the inductor element coil conductor includes a first coil conductor and a second coil conductor that are connected to each other, one of a coupling coefficient between the first coil conductor and the main line conductor, and a coupling coefficient between the second coil conductor and the main line conductor, is positive, and the other is negative, and one of a coupling coefficient between the first coil conductor and the current detection coil conductor, and a coupling coefficient between the second coil conductor and the current detection coil conductor, is positive, and the other is negative.

According to this configuration, even if each of the first coil conductor and second coil conductor is magnetically coupled with the main line conductor and current detection coil conductor, the first coil conductor and second coil conductor as a whole, i.e., the inductor element coil conductor, is not magnetically coupled with the main line conductor and the current detection coil conductor (or magnetic coupling is weak). Accordingly, the inductor element coil conductor can be placed close to the main line conductor and the current detection coil conductor, and the size of the inductor module can be reduced. Also, the inductance of the inductor element coil conductor can be adjusted by adjusting the number of winds of the first coil conductor and the second coil conductor, the shape of the coil openings, and so forth.

In the inductor module according to the present disclosure, a configuration may be made where the current detection coil conductor includes a first detection coil conductor and a second detection coil conductor that are connected to each other, both of a coupling coefficient between the first detection coil conductor and the main line conductor and a coupling coefficient between the second detection coil conductor and the main line conductor is positive or negative, and one of a coupling coefficient between the first detection coil conductor and the inductor element coil conductor, and a coupling coefficient between the second detection coil conductor and the inductor element coil conductor, is positive, and the other is negative.

According to this configuration, the coupling between the main line conductor and the current detection coil conductor can be increased by using the two of the first detection coil conductor and the second detection coil conductor, and current detection sensitivity can be raised. Also, even if the two of the first detection coil conductor and the second detection coil conductor are used, the first detection coil conductor and second detection coil conductor and the inductor element coil conductor are not magnetically coupled (or coupling is weak).

In the inductor module according to the present disclosure, a configuration may be made where the current detection coil conductor and the inductor element coil conductor have winding axes in the same direction, and coil openings of the current detection coil conductor and the inductor element coil conductor overlap in plan view along the winding axes.

According to this configuration, the current detection coil conductor and the inductor element coil conductor overlap, and thus reduction in the size of the inductor module can be realized.

In the inductor module according to the present disclosure, a configuration may be made where the inductor element coil conductor and the current detection coil conductor are formed on an insulator.

According to this configuration, the positions of the inductor element coil conductor and current detection coil conductor are fixed, and therefore variance in coupling due to positional shift between conductors (variance in unwanted coupling among coils) can be suppressed.

In the inductor module according to the present disclosure, a configuration may be made where at least part of the insulator is a magnetic substance.

In this configuration, inductance of the current detection conductor can be raised, and a magnetic field generated by current in the main line conductor and a magnetic field around the current detection conductor, can be contained within the layer.

The inductor module according to the present disclosure may further include the main line conductor, and the main line conductor may be formed on the insulator.

According to this configuration, the positions of the main line conductor and the inductor element coil conductor and current detection coil conductor are fixed, and therefore variance in coupling due to positional shift between conductors can be suppressed.

In the inductor module according to the present disclosure, a configuration may be made including two inductor element coil conductors each of which is the inductor element coil conductor, and the two inductor element coil conductors are magnetically coupled with each other.

According to this configuration, one of the two inductor element coil conductors can be used as a primary coil, and the other as a secondary coil in a transformer.

In an electric power transmission system according to the present disclosure, a transmission-side coupling unit included in a transmission device and a reception-side coupling unit included in a reception device are coupled by at least one of an electric field and a magnetic field, and electric power is transmitted from the transmission device to the reception device. The transmission device includes a current detection unit that detects current flowing through an electric power transmission line connected to the transmission coupling unit. The current detection unit includes a current detection coil conductor that is magnetically coupled with a main line conductor, and an inductor element coil conductor. An absolute value of a coupling coefficient between the main line conductor and the inductor element coil conductor, and an absolute value of a coupling coefficient between the current detection coil conductor and the inductor element coil conductor, are each smaller than an absolute value of a coupling coefficient between the main line conductor and the current detection coil conductor, and the main line conductor constitutes part of the electric power transmission line.

According to this configuration, current flowing at the transmission-side coupling unit can be detected with good sensitivity at the transmission device. Determination of whether or not a reception device has been placed thereupon, and state detection of abnormalities and so forth, can be performed from the magnitude of the detected current, and change in phase.

In the electric power transmission system according to the present disclosure, a configuration may be made where the transmission device includes a voltage dividing circuit connected to the electric power transmission line. The current detection unit includes two inductor element coil conductors each of which is the inductor element coil conductor, the two inductor element coil conductors are magnetically coupled with each other, and one of the two inductor element coil conductors is connected to the voltage dividing circuit.

According to this configuration, voltage in a divided-voltage circuit can be detected by using the two inductor element coil conductors as a transformer. Accordingly, voltage applied to the transmission-side coupling unit can be detected.

Advantageous Effects of Disclosure

According to the present disclosure, an inductor module that can detect current flowing through a main line conductor, and also can be used as an inductor element, can be realized.

DETAILED DESCRIPTION

Embodiment 1

Figure 1A:
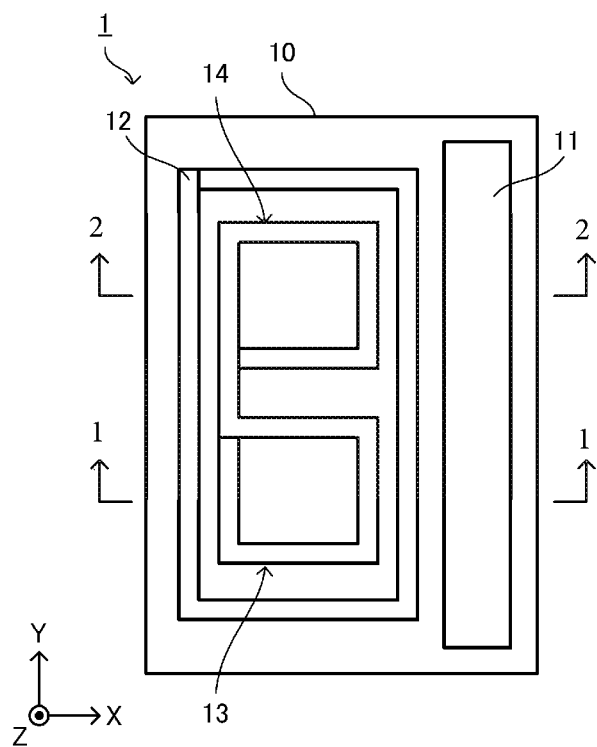
FIG. 1(A) is a plan view of an inductor module according to Embodiment 1.
Figure 1B:
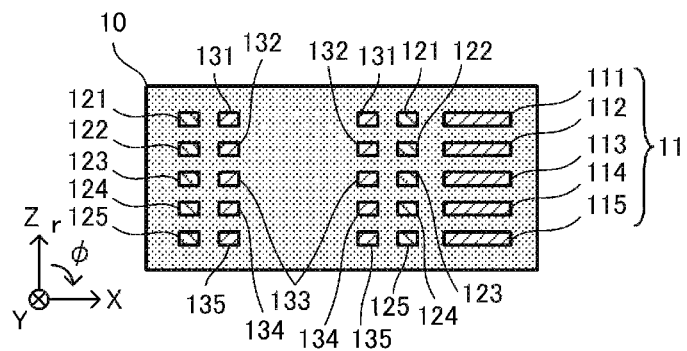
FIG. 1(B) is a cross-sectional view taken along line 1-1 in FIG. 1(A)
Figure 1C:
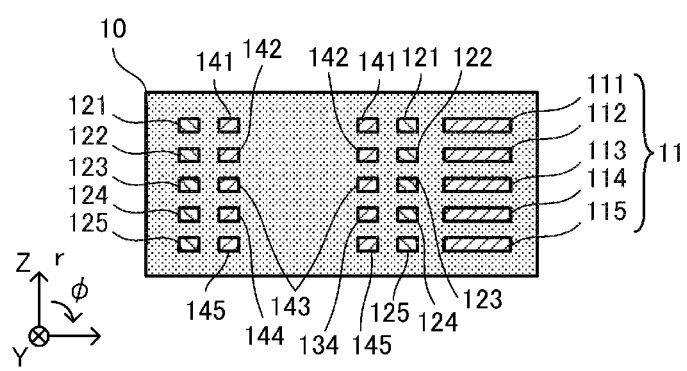
FIG. 1(C) is a cross-sectional view taken along line 2-2 in FIG. 1(A).

FIG. 1(A) is a plan view of an inductor module according to Embodiment 1, FIG. 1(B) is a cross-sectional view taken along line 1-1 in FIG. 1(A), and FIG. 1(C) is a cross-sectional view taken along line 2-2 in FIG. 1(A). Note that the plan view in FIG. 1(A) is a view illustrating inside of the inductor module.

An inductor module 1 includes a laminate 10, a main line conductor 11, a current detection conductor 12, and coil conductors 13 and 14. The current detection conductor 12 is an example of a "current detection coil conductor" according to the present disclosure. The coil conductors 13 and 14 are examples of an "inductor element coil conductor" according to the present disclosure. The coil conductor 13 is an example of a "first coil conductor" according to the present disclosure, and the coil conductor 14 is an example of a "second coil conductor" according to the present disclosure.

The laminate 10 is formed by laminating multiple ferrite sheets, and integrally sintering the multiple ferrite sheets. Multiple mounting electrodes (not illustrated) for mounting to a motherboard are formed on one main surface of the laminate 10 (surface of the laminate 10 at a negative side in the Z direction. Hereinafter referred to as a lower face). The inductor module 1 is mounted with the lower face toward the motherboard side. FIG. 1(A) is a plan view illustrating the other main face that is on the opposite side of the laminate 10 from the lower face of the laminate 10 in the laminating direction of the laminate 10 (a surface of the laminate 10 at a positive side in the Z direction. Hereinafter referred to as upper face). Multiple mounting electrodes (not illustrated) may be formed on the upper face of the laminate 10, to mount mounting components such as ICs (integrated circuits), capacitors, and so forth, to be mounted in the inductor module 1.

The main line conductor 11 has a main portion that is long and in the form of a straight line in one direction (Y direction), and is formed on a ferrite sheet of the laminate 10. Both ends of the main line conductor 11 in the longitudinal-direction (Y direction) are connected to the mounting electrodes on the lower face of the laminate 10 via inter-layer connection conductors, and current flows in the longitudinal direction (Y direction) of the main line conductor 11.

The current detection conductor 12 has the form of a coil, with the winding axis being in the laminating direction of the laminate 10. In detail, open-loop conductor patterns 121, 122, 123, 124, and 125 are printed on different layers of ferrite sheets in the laminate 10. The conductor patterns 121 through 125 are connected by inter-layer connection conductors that are not illustrated, thereby forming the current detection conductor 12. In plan view of the coil opening of the current detection conductor 12, the current detection conductor 12 is disposed adjacent to the main line conductor 11 with a gap in between. Accordingly, in a cylindrical coordinate system with the main line conductor 11 as the axis thereof, where the direction in which the current of the main line conductor 11 flows (Y direction) is the axial direction, the winding axis of the current detection conductor 12 is in the circumferential direction (φ direction) or on a straight line (Z direction) that is tangent to the circumferential direction. Note that both ends of the current detection conductor 12 are connected by inter-layer connection conductors (not illustrated) to different mounting electrodes formed on the lower face of the laminate 10.

This current detection conductor 12 is for detecting current flowing through the main line conductor 11. When current flows through the main line conductor 11, a magnetic flux of which the direction is the circumferential direction (φ direction) is generated around the main line conductor 11, and this magnetic flux interlinks with the coil opening of the current detection conductor 12. Thus, induced electromotive force is generated at the current detection conductor 12, and an induced current flows in accordance with the induced electromotive force. Current flowing through the main line conductor 11 can be detected by detecting this induced current (or induced electromotive force).

The coil conductors 13 and 14 are formed in the laminate 10, with the direction of the winding axes thereof being the same as the direction of the winding axis of the current detection conductor 12. The coil conductors 13 and 14 are formed within the coil opening of the current detection conductor 12 and arrayed along the direction of current flowing through the main line conductor 11 (Y direction) in plan view of the coil openings of the current detection conductor 12. In a cylindrical coordinate system with the main line conductor 11 as the axis thereof, where the direction in which the current of the main line conductor 11 flows (Y direction) is the axial direction, the winding axes of the coil conductors 13 and 14 are in the circumferential direction (φ direction) or on a straight line (Z direction) that is tangent to the circumferential direction of the axis. Note that in other embodiments as well, the cylindrical coordinate system will be defined by the axial direction (direction of current flowing through main portion of main line conductor), circumferential direction (φ direction), and diameter direction (r direction), with the main portion of the main line conductor as an axis.

The coil conductor 13 is formed by open-loop conductor patterns 131, 132, 133, 134, and 135 being printed on different layers of ferrite sheets in the laminate 10, and connected by inter-layer connection conductors. In the same way, the coil conductor 14 is formed by open-loop conductor patterns 141, 142, 143, 144, and 145 being connected by inter-layer connection conductors. One end of each of the coil conductors 13 and 14 at the upper side (positive side in the Z direction) (one end of each of the conductive patterns 131 and 141) are connected, thereby forming a single inductor element.

The inductor element configured by the coil conductors 13 and 14 is independent from the main line conductor 11 and from the current detection conductor 12. Here, "independent" means that the inductor element is not magnetically coupled with the main line conductor 11 and the current detection conductor 12, or that magnetic coupling is weak between them. Accordingly, the inductor module 1 has both functions of a current detection element that detects current flowing through the main line conductor 11, and an inductor element.

When current flows through the main line conductor 11, a magnetic flux of which the direction is the circumferential direction (φ direction) is generated around the main line conductor 11. This magnetic flux interlinks with the coil openings of the current detection conductor 12, coil conductor 13, and coil conductor 14. The main line conductor 11 is then magnetically coupled with the current detection conductor 12, coil conductor 13, and coil conductor 14. The inductor module 1 is formed such that in this coupling, the coil conductor 13 and the main line conductor 11 are positively coupled (coupling in which the magnetic fluxes generated when applying current to two conductors intensify each other), and the coil conductor 14 and the main line conductor 11 are negatively coupled (coupling in which the magnetic fluxes generated when applying current to two conductors weaken each other). The inductor module 1 is also formed such that the coil conductor 13 and the current detection conductor 12 are negatively coupled, and the coil conductor 14 and the current detection conductor 12 are positively coupled.

The following is a description of magnetic coupling among conductors in the inductor module 1.

Figure 2:
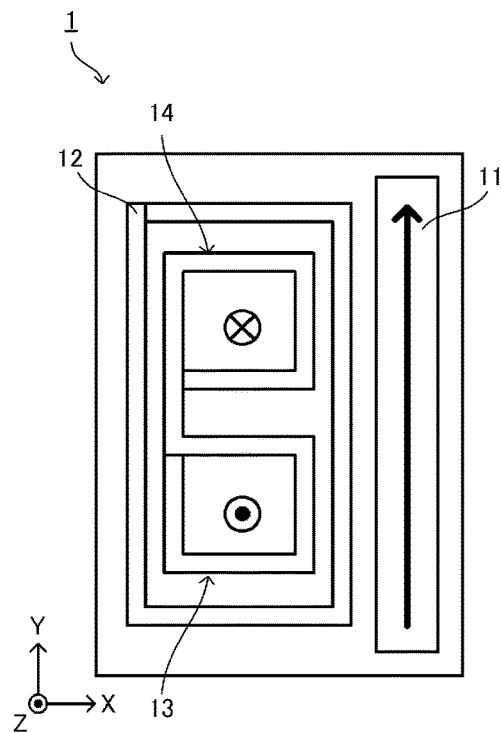
FIG. 2 is a diagram for describing a current flowing through a main line conductor and the direction of a magnetic field (or magnetic flux) generated by the current.
Figure 3:
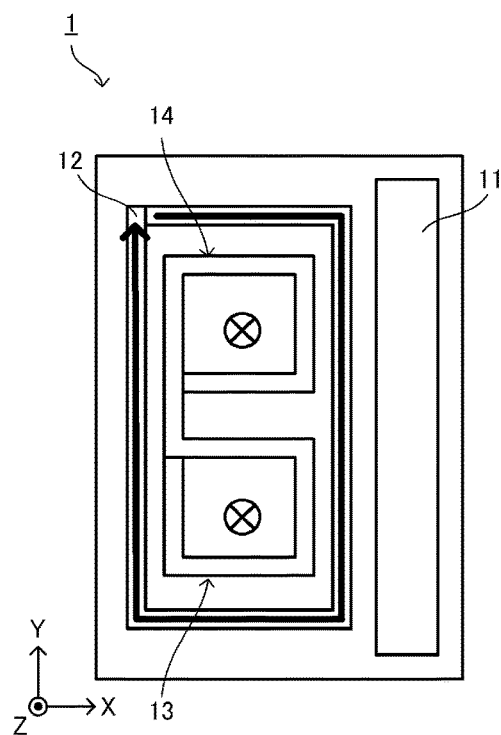
FIG. 3 is a diagram for describing a current flowing through a current detection conductor and the direction of a magnetic field (or magnetic flux) generated by the current.
Figure 4:
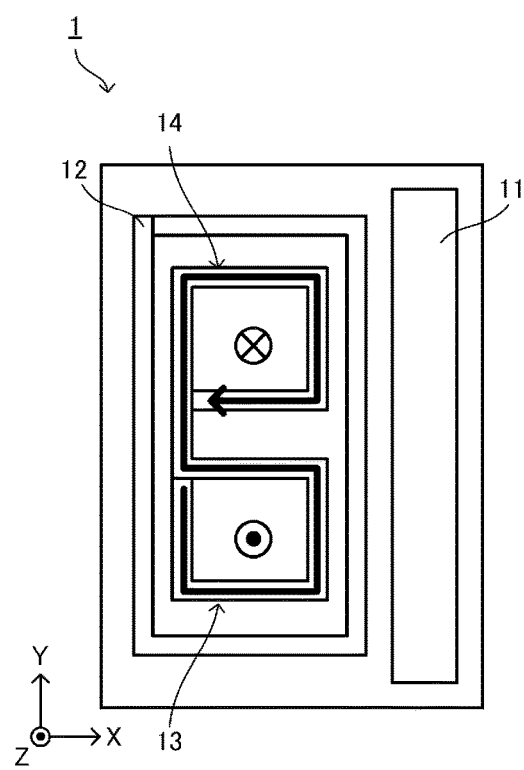
FIG. 4 is a diagram for describing a current flowing through an inductor element configured of coil conductors and the direction of a magnetic field (or magnetic flux) generated by the current.

FIG. 2 is a diagram for describing a current flowing through the main line conductor 11 and the direction of a magnetic field (or magnetic flux) generated by the current, FIG. 3 is a diagram for describing a current flowing through the current detection conductor 12 and the direction of a magnetic field (or magnetic flux) generated by the current, and FIG. 4 is a diagram for describing a current flowing through the inductor element configured of the coil conductors 13 and 14 and the direction of a magnetic field (or magnetic flux) generated by the current.

In a case where the current flowing through the main line conductor 11 is in the direction of the arrow illustrated in FIG. 2 (positive direction in the Y direction), a magnetic flux heading from the lower side of the coil opening of the current detection conductor 12 toward the upper side (positive direction in Z the direction) is interlinked at the coil opening of the current detection conductor 12. This generates induced electromotive force at the current detection conductor 12, and induced current flows through the current detection conductor 12 in accordance with the induced electromotive force. Detecting this induced current (or induced electromotive force) enables current flowing through the main line conductor 11 to be detected.

The magnetic flux of which the direction is the circumferential direction (φ direction) that is generated around the main line conductor 11 due to current flowing through the main line conductor 11 interlinks with the coil openings of the coil conductors 13 and 14 as well. The coil conductors 13 and 14 are each magnetically coupled with the main line conductor 11. The coil conductor 13 and main line conductor 11 are positively coupled, and the coil conductor 14 and main line conductor 11 are negatively coupled.

Figure 5:
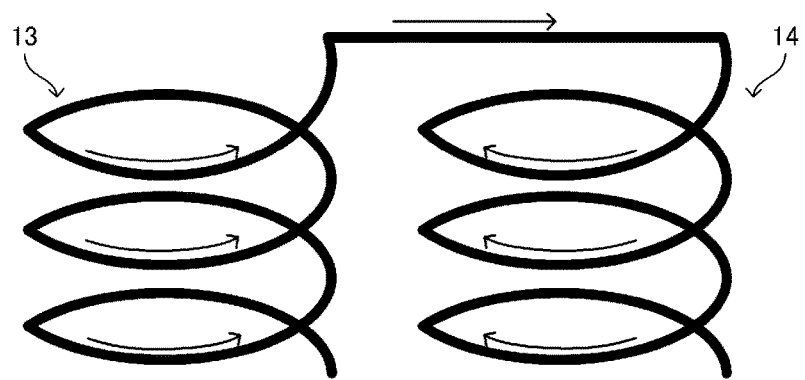
FIG. 5 is a diagram for describing a connection structure of coil conductors and the direction of a current flowing through the coil conductors.
Figure 6:
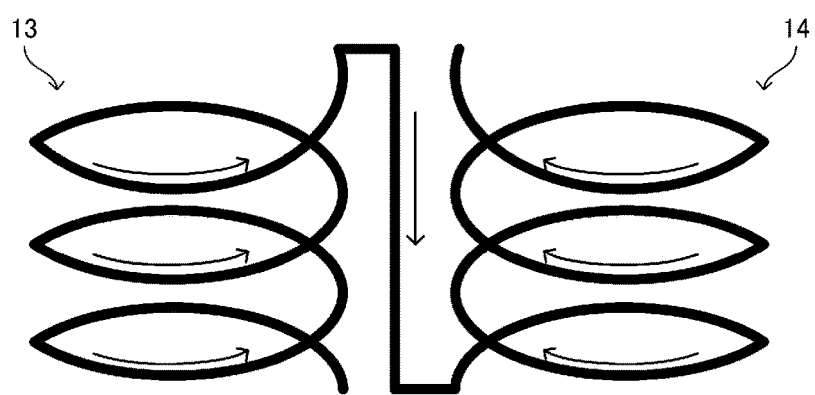
FIG. 6 is a diagram for describing a connection structure of coil conductors and the direction of a current flowing through the coil conductors.
Figure 7:
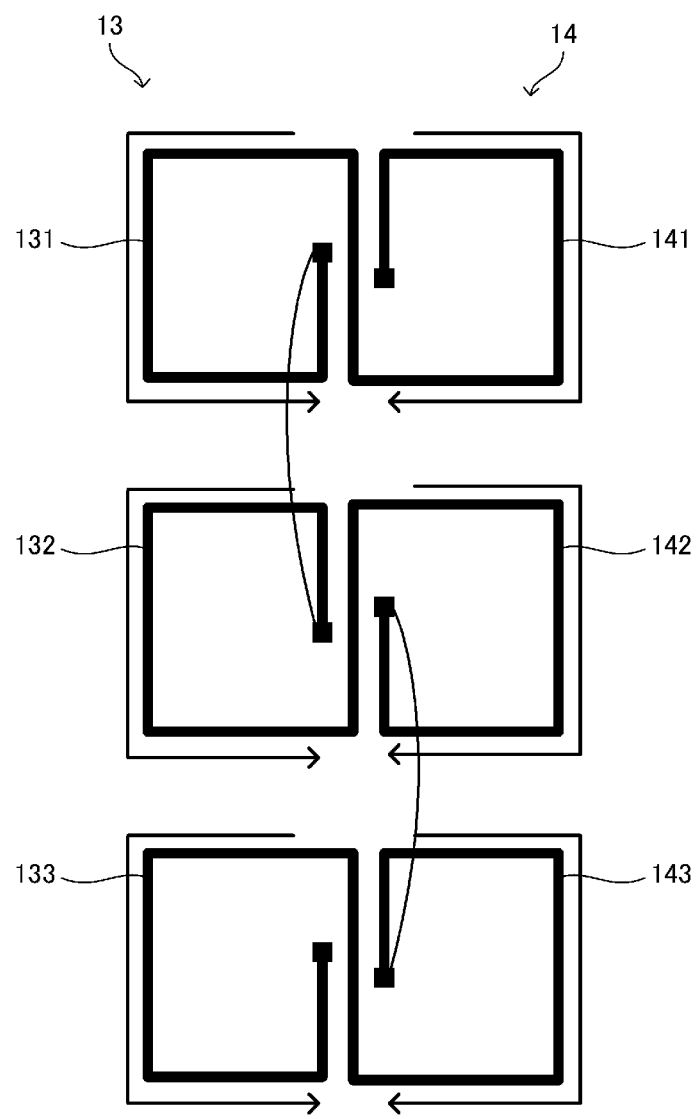
FIG. 7 is a diagram for describing a connection structure of coil conductors and the direction of a current flowing through the coil conductors.

FIG. 5, FIG. 6, and FIG. 7 are diagrams for describing connection structures of coil conductors 13 and 14 and the direction of current flowing through the coil conductors.

The coil conductors 13 and 14 are formed and connected such that, in plan view of the coil openings of the coil conductors 13 and 14, currents flowing circling in opposite directions from each other do not cancel each other out (that is, intensify each other), and currents flowing circling in the same direction cancel each other out (that is, weaken each other). For example, as illustrated in FIG. 5, in a case where the winding directions of the coil conductors 13 and 14 are the same direction in plan view of the coil openings of the coil conductors 13 and 14, the upper one ends of the coil conductors 13 and 14 are to be connected. Alternatively, the lower one ends of the coil conductors 13 and 14 may be connected. As illustrated in FIG. 6, in a case where the winding directions of the coil conductors 13 and 14 are the opposite directions in plan view of the coil openings of the coil conductors 13 and 14, the upper one end of the coil conductor 13 and the lower one end of the coil conductor 14 are to be connected. Alternatively, the lower one end of the coil conductor 13 and the upper one end of the coil conductor 14 may be connected.

Even in a case where the conductor patterns 131 and 141, the conductor patterns 132 and 142, and the conductor patterns 133 and 143, respectively printed on the same ferrite sheet layer, are formed as a single continuation, as illustrated in FIG. 7, the conductor patterns in each layer, i.e., the conductor patterns 131, 132, and 133, and conductor patterns 141, 142, and 143, are to be connected such that, in plan view of the coil openings of the conductor patterns 131, 132, 133, 141, 142, and 143, currents flowing circling in opposite directions from each other do not cancel each other out (that is, intensify each other), and currents flowing circling in the same direction cancel each other out (that is, weaken each other).

In a case where the current flowing through the inductor element configured of the coil conductors 13 and 14 is in the direction of the arrow illustrated in FIG. 4, a magnetic flux heading from the lower side of the coil opening of the coil conductor 13 toward the upper side (positive direction in the Z direction) is interlinked at the coil opening of the coil conductor 13, and a magnetic flux heading from the upper side of the coil opening of the coil conductor 14 toward the lower side (negative direction in the Z direction) is interlinked at the coil opening of the coil conductor 14. Now, due to the coil conductors 13 and 14 being laid out within the coil opening of the current detection conductor 12, the magnetic flux heading from the lower side of the coil opening of the current detection conductor 12 toward the upper side (positive direction in the Z direction) and the magnetic flux heading from the upper side of the coil opening of the current detection conductor 12 toward the lower side (negative direction in the Z direction) are interlinked, so induced current (or induced electromotive force) generated at the current detection conductor 12 is cancelled out. In other words, the current detection conductor 12 and coil conductor 13 are negatively coupled, and the current detection conductor 12 and coil conductor 14 are positively coupled, so the current detection conductor 12 and the inductor element configured of the coil conductors 13 and 14 are not magnetically coupled (or magnetic coupling is weak).

In the same way, with regard to the main line conductor 11 as well, the direction of the magnetic flux generated by current flowing through the coil conductor 13 interlinking with the main line conductor 11 (positive direction in the (φ direction) and the direction of the magnetic flux generated by current flowing through the coil conductor 14 interlinking with the main line conductor 11 (negative direction in the (φ direction) are opposite directions, so the induced current generated at the main line conductor 11 is cancelled out. In other words, the main line conductor 11 and coil conductor 13 are positively coupled and the main line conductor 11 and coil conductor 14 are negatively coupled, so the main line conductor 11 and the inductor element configured of the coil conductors 13 and 14 are not magnetically coupled (or magnetic coupling is weak).

Positive coupling and negative coupling will be described below.

In a case of positive coupling, the coupling coefficient is positive, and in a case of negative coupling, the coupling coefficient is negative.

FIG. 8(A), FIG. 8(B), FIG. 8(C), and FIG. 8(D) are diagrams for describing coupling coefficients between two inductors L1 and L2. The coupling coefficient k can be expressed as $k=M/\cdot(L \times L2)$, where M represents the mutual inductance of two inductors L1 and L2.

Figure 8A:
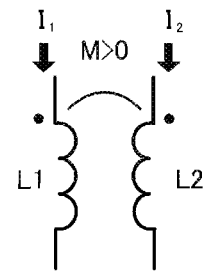
FIG. 8(A), FIG. 8(B), FIG. 8(C), and FIG. 8(D) are diagrams for describing coupling coefficients between two inductors.
Figure 8B:
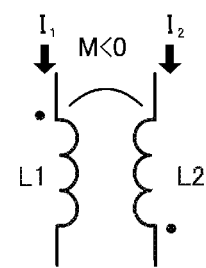
Figure 8C:
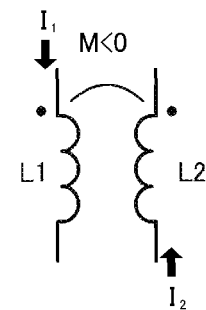
Figure 8D:
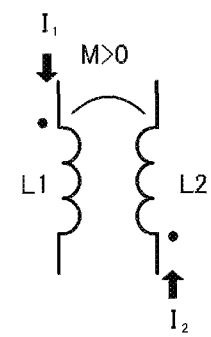

As illustrated in FIG. 8(A) and FIG. 8(D), in a case where the side where currents $I_1$ and $I_2$ applied to the inductors L1 and L2 flow in, and the high-potential side of induced electromotive force generated by the applied currents $I_1$ and $I_2$ is the same side, the mutual inductance M is positive (M>0). In this case, the coupling coefficient is also positive (k>0). As illustrated in FIG. 8(B) and FIG. 8(C), in a case where the side where currents $I_1$ and $I_2$ applied to the inductors L1 and L2 flow in, and the low-potential side of induced electromotive force generated by the applied currents $I_1$ and $I_2$ is the same side, the mutual inductance M is negative (M<0). In this case, the coupling coefficient is also negative (k<0).

Figure 9:
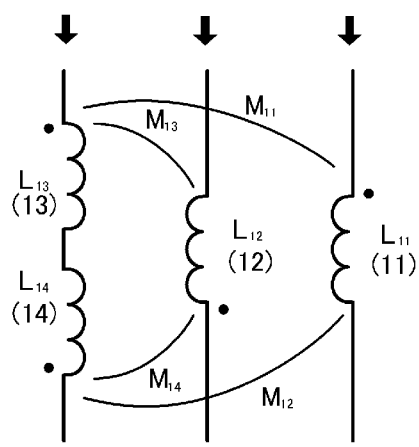
FIG. 9 is a diagram illustrating an equivalent circuit of a main line conductor, current detection conductor, and coil conductor.

FIG. 9 is a diagram illustrating an equivalent circuit of the main line conductor 11, current detection conductor 12, and coil conductors 13 and 14. The inductor $L_{11}$ is the inductance component of the main line conductor 11. The inductor $L_{12}$ is the inductance component of the current detection conductor 12. The inductors $L_{13}$ and $L_{14}$ are the inductance components of the coil conductors 13 and 14. Note that the directions of currents applied to respective lines on the equivalent circuit are defined by the direction of arrows in FIG. 9. Directions of coupling among the inductors in the equivalent circuit also are defined by the positions of dot symbols in FIG. 9.

$M_{11}$ represents mutual inductance between inductor $L_{11}$ (main line conductor 11) and inductor $L_{13}$ (coil conductor 13). $M_{12}$ represents mutual inductance between inductor $L_{11}$ (main line conductor 11) and inductor $L_{14}$ (coil conductor 14). $M_{13}$ represents mutual inductance between inductor $L_{12}$ (current detection conductor 12) and inductor $L_{13}$ (coil conductor 13). $M_{14}$ represents mutual inductance between inductor $L_{12}$ (current detection conductor 12) and inductor $L_{14}$ (coil conductor 14).

$M_{11}$>0 holds for inductor $L_{11}$ (main line conductor 11) and inductor $L_{13}$ (coil conductor 13) due to the relationship illustrated in FIG. 8(A), so the coupling coefficient is positive. Accordingly, the main line conductor 11 and coil conductor 13 are positively coupled. $M_{14}$>0 holds for inductor $L_{11}$ (main line conductor 11) and inductor $L_{14}$ (coil conductor 14) due to the relationship illustrated in FIG. 8(B), so the coupling coefficient is negative. Accordingly, the main line conductor 11 and coil conductor 14 are negatively coupled.

In the same way, the coupling coefficient for inductor $L_{12}$ (current detection conductor 12) and inductor $L_{13}$ (coil conductor 13) is negative, so the current detection conductor 12 and coil conductor 13 are negatively coupled. The coupling coefficient for inductor $L_{12}$ (current detection conductor 12) and inductor $L_{14}$ (coil conductor 14) is positive, so the current detection conductor 12 and coil conductor 14 are positively coupled.

In a case where there is no magnetic coupling between the main line conductor 11 and the inductor element configured of the coil conductors 13 and 14, the mutual inductance $M_{11}$ and mutual inductance $M_{12}$ satisfy the relationship of $M_{11}+M_{12}=0$. In a case where there is no magnetic coupling between the current detection conductor 12 and the inductor element configured of the coil conductors 13 and 14, the mutual inductance $M_{13}$ and mutual inductance $M_{14}$ satisfy the relationship of $M_{13}+M_{14}=0$.

Note that the main line conductor 11 and the inductor element configured of the coil conductors 13 and 14 may be magnetically coupled slightly. That is to say, the relationship of $M_{11}+M_{12}\approx 0$ may be permissible. Also, the current detection conductor 12 and the inductor element configured of the coil conductors 13 and 14 may be magnetically coupled slightly. That is to say, the relationship of $M_{13}+M_{14}\approx 0$ may be permissible.

As described above, the current flowing through the main line conductor 11 can be thus detected by detecting the induced current (or induced electromotive force) at the current detection conductor 12. That is to say, the inductor module 1 can be used as a current detection element that detects current flowing through the main line conductor 11. The inductor element including the coil conductors 13 and 14 is also independent from the main line conductor 11 and current detection conductor 12. Accordingly, the inductor module 1 can be used as an inductor element as well. That is to say, the inductor module 1 including both a current detection element that detects current flowing through the main line conductor 11, and an independent inductor element, at the same time, can be realized. The size of a device in which the inductor module 1 is mounted can be reduced by integrating these two elements into a single module.

With regard to the positional relationship between the coil conductors 13 and 14 in the present embodiment, in a case of applying current to the inductor element configured of the coil conductors 13 and 14, the high potential side of induced electromotive force generated in the coil conductor 14 by the current applied to the coil conductor 13, and the side where current applied to the coil conductor 14 flows in, agree. In other words, if $M_{13}$ represents the mutual inductance between inductor $L_{13}$ (coil conductor 13) and inductor $L_{14}$ (coil conductor 14), $M_{15}$>0 holds, so the coupling coefficient is positive. Where M represents mutual inductance between two inductors L1 and L2, the composited inductance Lc in a case where the two inductors are connected and magnetically coupled can be expressed by Lc=L1+L2+2×M, so the inductance $L_{34}$ of the inductor element configured of the coil conductors 13 and 14 in the present embodiment is $L_{34}=L_{13}+L_{14}+2\times M_{15}>L_{13}+L_{14}$, and a greater inductance than in a case of connecting in series the coil conductors 13 and 14 in a state of not being magnetically coupled with each other can be obtained. As a result, an inductor element can be formed that is configured from coil conductors 13 and 14 having a great inductance.

Note that in the present embodiment, the main line conductor 11 is formed as a straight line, and applied current flows in the direction extending as a straight line. The main line conductor 11 is formed as a straight line, and thus can be configured in the shortest distance as compared to a case of being formed as a curve, so increased resistance and inductance of the main line conductor 11 can be suppressed. Accordingly, variance in circuit properties occurring when inserting the inductor module 1 according to the present embodiment into a circuit for current detection can be minimized.

Note that in the present embodiment, the configuration is such that the coil conductors 13 and 14 fit within the coil opening of the current detection conductor 12 in plan view of the coil openings of the current detection conductor 12 and coil conductors 13 and 14. Accordingly, this provides the function of shielding, where the current detection conductor 12 distances the main line conductor 11 and the coil conductors 13 and 14 from each other, and the current detection conductor 12 impedes electromagnetic coupling (particularly electric coupling) between the main line conductor 11 and the coil conductors 13 and 14. Thus, interaction between the main line conductor 11 and the coil conductors 13 and 14 can be suppressed. The main line conductor 11 and the current detection conductor 12 are laid out in close proximity, so the mutual inductance of the main line conductor 11 and the current detection conductor 12 can be increased, and the detection sensitivity of current can be improved.

Note that in the present embodiment, forming the current detection conductor 12 and the coil conductors 13 and 14 on the same insulator enables slight variance in magnetic coupling that may occur between the current detection conductor 12 and coil conductors 13 and 14 due to positional shift to be suppressed. The current detection conductor 12 and coil conductors 13 and 14 are configured so that magnetic coupling does not readily occur, so even a slight amount of magnetic coupling may have great effects. Further, forming the main line conductor 11 on the same insulator as well enables variance in magnetic coupling between each of the main line conductor and current detection conductor 12 and coil conductors 13 and 14 due to positional shift to be suppressed. Note that the laminate 10 may partially have a magnetic substance layer. In this case, the inductance of the current detection conductor 12 can be increased, and the induced electromotive force generated at the current detection conductor 12 can be increased, so current detection sensitivity can be improved. The inductance of the inductor element configured of the coil conductors 13 and 14 can similarly be improved. Further, the magnetic flux generated by current in the main line conductor 11 and the magnetic flux around the current detection conductor 12 can be contained within that layer.

In the present embodiment, description has been made that the main line conductor 11 and coil conductor 13 are positively coupled, and the main line conductor 11 and coil conductor 14 are negatively coupled, but the polarity of coupling may be reverse. Specifically, an arrangement may be made where the main line conductor 11 and coil conductor 13 are negatively coupled, and the main line conductor 11 and coil conductor 14 are positively coupled.

In the same way, description has been made in the present embodiment that the current detection conductor 12 and coil conductor 13 are negatively coupled, and the current detection conductor 12 and coil conductor 14 are positively coupled, but the polarity of coupling may be reverse. Specifically, an arrangement may be made where the current detection conductor 12 and coil conductor 13 are positively coupled, and the current detection conductor 12 and coil conductor 14 are negatively coupled.

Now, the standard by which the single inductor element configured of the coil conductors 13 and 14 is not to be magnetically coupled with the main line conductor 11 and current detection conductor 12 is that the absolute value of the coupling coefficient between the main line conductor 11 and the inductor element, and the absolute value of the coupling coefficient between the current detection conductor 12 and the inductor element, are each smaller than the absolute value of the coupling coefficient between the main line conductor 11 and the current detection conductor 12. In the other embodiments as well, a case where the absolute value of the coupling coefficient between the main line conductor and the inductor element, and the absolute value of the coupling coefficient between the current detection conductor and the inductor element, are each smaller than the absolute value of the coupling coefficient between the main line conductor and the current detection conductor, is a case where the inductor element is not to be magnetically coupled with the main line conductor and current detection conductor.

The coupling coefficient between the inductor element configured of the coil conductors 13 and 14 and the main line conductor 11, or the coupling coefficient between the inductor element and the current detection conductor 12, needs to be calculated by taking multiple mutual inductances into consideration.

Figure 10:
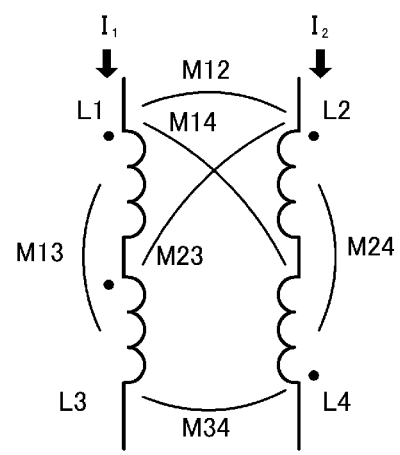
FIG. 10 is a diagram for describing a case of calculating coupling coefficients by taking multiple mutual inductances into consideration.

FIG. 10 is a diagram for describing a case of calculating coupling coefficients by taking multiple mutual inductances into consideration.

M12 represents mutual inductance between inductors L1 and L2. M13 represents mutual inductance between inductors L1 and L3. M14 represents mutual inductance between inductors L1 and L4. M23 represents mutual inductance between inductors L2 and L3. M24 represents mutual inductance between inductors L2 and L4. M34 represents mutual inductance between inductors L3 and L4. In this case, the coupling coefficient k can be expressed by $k=(M12+M14+M23+M34)/\sqrt{((L1+L3+2\times M13)\times(L2+L4+2\times M24))}$. The polarities of the mutual inductances are defined the same as in FIG. 8.

Using the above expression enables the coupling coefficient and so forth between the single inductor element configured of the coil conductors 13 and 14 and the main line conductor 11 to be calculated. The coupling coefficient and so forth can also be calculated for cases wherein the main line conductor, current detection conductor, and coil conductor, are each a plurality, by using the above expression.

Another configuration example of the inductor module 1 will be described below.

Figure 11A:
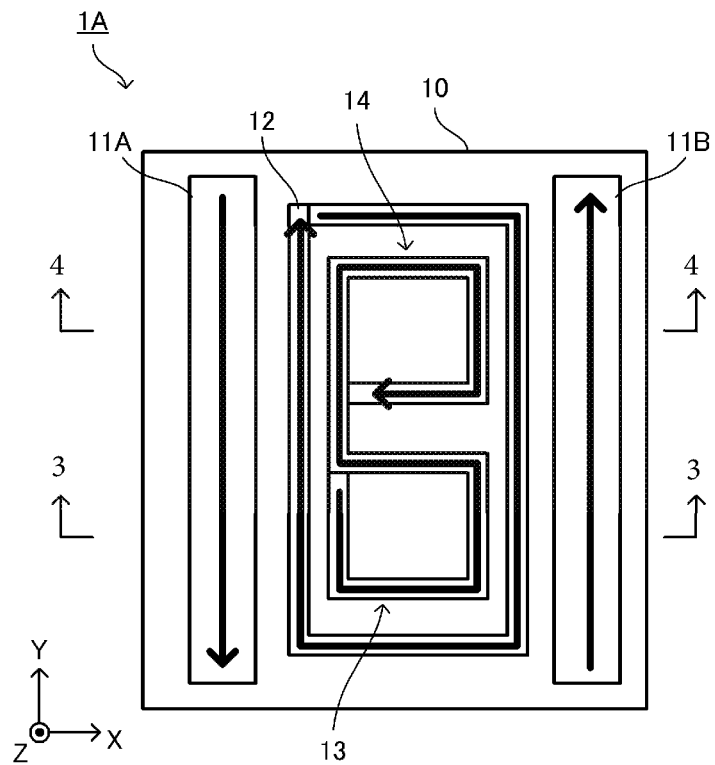
FIG. 11(A) is a plan view of an inductor module according to another example.
Figure 11B:
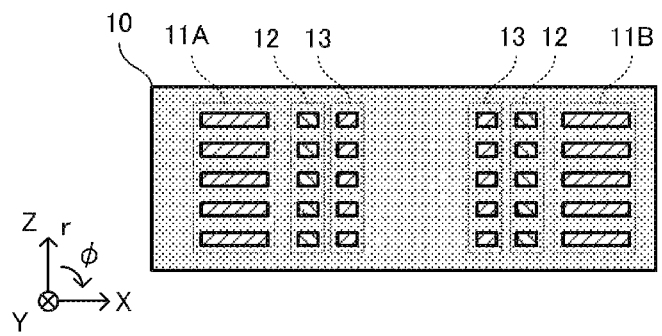
FIG. 11(B) is a cross-sectional view taken along line 3-3 in FIG. 11(A)
Figure 11C:
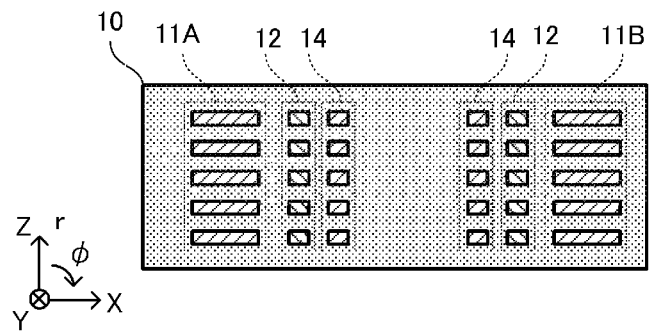
FIG. 11(C) is a cross-sectional view taken along line 4-4 in FIG. 11(A).

FIG. 11(A) is a plan view of an inductor module 1A according to another example, FIG. 11(B) is a cross-sectional view taken along line 3-3 in FIG. 11(A), and FIG. 11(C) is a cross-sectional view taken along line 4-4 in FIG. 11(A). Note that the arrows in FIG. 11(A) indicate the directions of currents flowing through main line conductors 11A and 11B, the current detection conductor 12 and the inductor element configured of the coil conductors 13 and 14.

The inductor module 1A differs from the inductor module 1 with regard to the configuration of the main line conductors 11A and 11B. The main line conductors 11A and 11B extend straight in the same direction, and are formed parallel to each other. The main line conductors 11A and 11B are also formed by straight-line conductor patterns printed on different layers of ferrite sheets of the laminate 10 being connected by inter-layer connecting conductors that are not illustrated. Forming the main line conductors 11A and 11B from multiple conductor patterns enables the inductance component and resistance component of the main line conductors 11A and 11B to be reduced. The current detection conductor 12 and coil conductors 13 and 14 are formed between the main line conductors 11A and 11B. Current flows in mutually opposite directions in the main line conductors 11A and 11B. The main line conductors 11A and 11B are not connected with each other by inter-layer connecting conductors. In a case of each being connected to differential lines, current can be detected without losing the balance (equilibrium) of the differential line by connecting the main line conductor 11A to the normal phase side of the differential line and the main line conductor 11B to the reverse phase side of the differential line, for example.

Figure 12A:
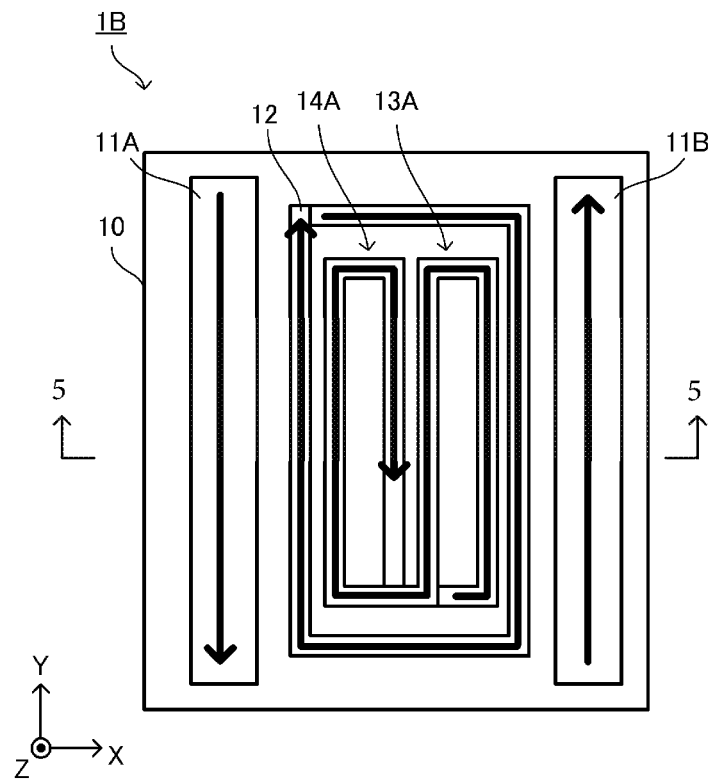
FIG. 12(A) is a plan view of an inductor module according to another example.
Figure 12B:
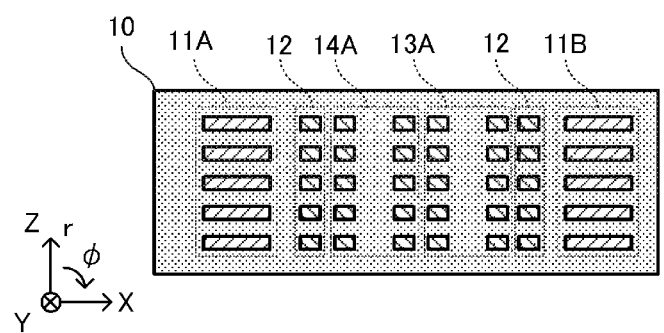
FIG. 12(B) is a cross-sectional view taken along line 5-5 in FIG. 12(A).

FIG. 12(A) is a plan view of an inductor module 1B according to another example, and FIG. 12(B) is a cross-sectional view taken along line 5-5 in FIG. 12(A). Note that the arrows in FIG. 12(A) indicate the directions of currents flowing through the main line conductors 11A and 11B, the current detection conductor 12 and the inductor element configured of coil conductors 13A and 14A.

The inductor module 1B differs from the inductor module 1A illustrated in FIG. 11(A) and so forth, with regard to the configuration of the coil conductors 13A and 14A. the coil conductors 13A and 14A are laid out between the main line conductors 11A and 11B, in directions orthogonal to the longitudinal direction of the main line conductor 11A and 11B. The coil conductors 13A and 14A are formed so that induced current flows in opposite directions from each other in plan view.

Figure 13A:
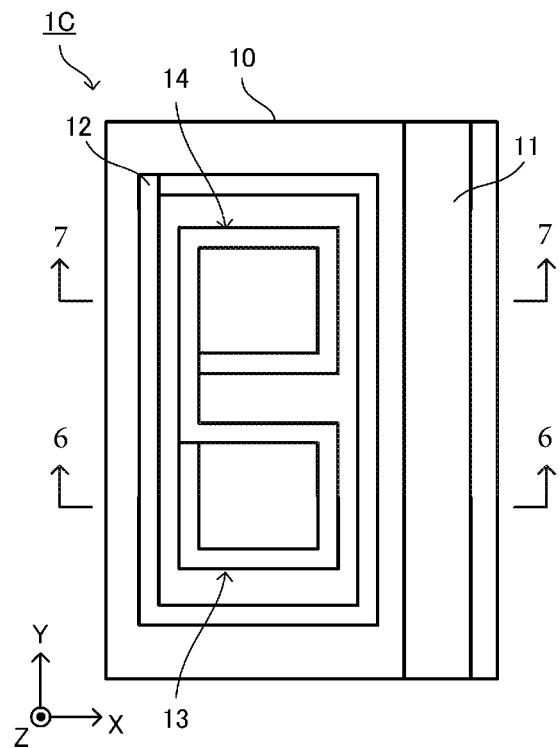
FIG. 13(A) is a plan view of an inductor module according to another example.
Figure 13B:
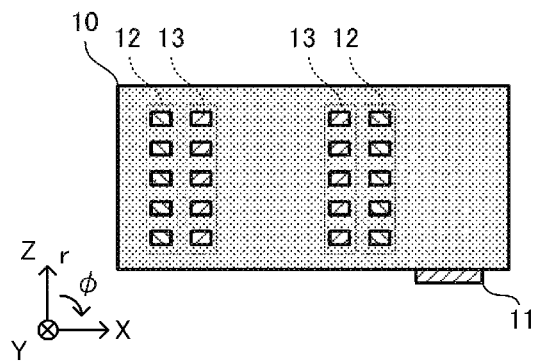
FIG. 13(B) is a cross-sectional view taken along line 6-6 in FIG. 13(A)
Figure 13C:
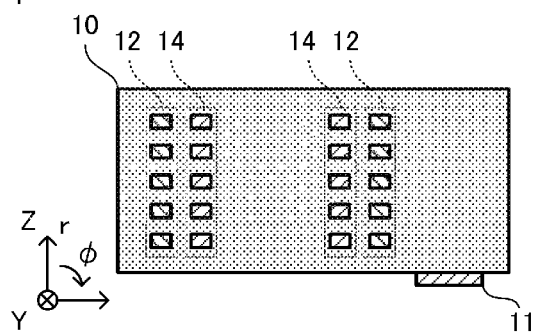
FIG. 13(C) is a cross-sectional view taken along line 7-7 in FIG. 13(A).

FIG. 13(A) is a plan view of an inductor module 1C according to another example, FIG. 13(B) is a cross-sectional view taken along line 6-6 in FIG. 13(A), and FIG. 13(C) is a cross-sectional view taken along line 7-7 in FIG. 13(A).

The inductor module 1C in this example differs from the inductor module 1 with regard to the point that the main line conductor 11 is provided on the lower face of the laminate 10 (the main surface on the side that is mounted to the motherboard). Note that there is no need for the main line conductor 11 to be formed on the surface or interior of the laminate 10. For example, the main line conductor 11 may be formed on the motherboard side.

Figure 14A:
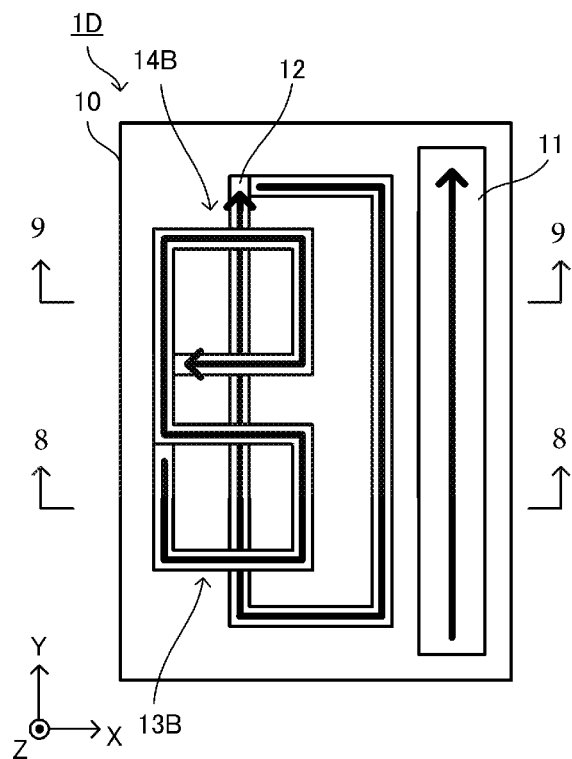
FIG. 14(A) is a plan view of an inductor module according to another example.
Figure 14B:
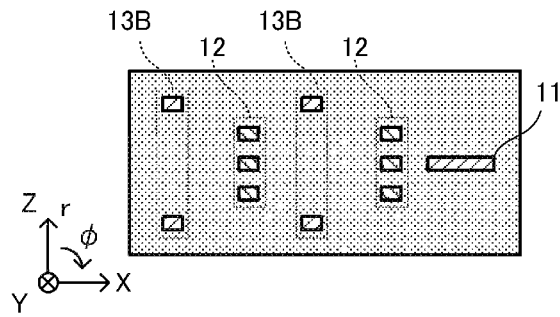
FIG. 14(B) is a cross-sectional view taken along line 8-8 in FIG. 14(A)
Figure 14C:
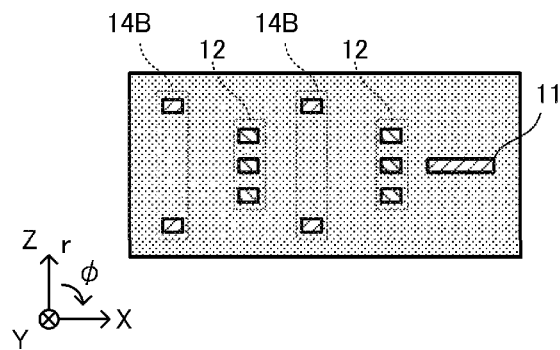
FIG. 14(C) is a cross-sectional view taken along line 9-9 in FIG. 14(A).

FIG. 14(A) is a plan view of an inductor module 1D according to another example, FIG. 14(B) is a cross-sectional view taken along line 8-8 in FIG. 14(A), and FIG. 14(C) is a cross-sectional view taken along line 9-9 in FIG. 14(A). Note that the arrows in FIG. 14(A) indicate the directions of currents flowing through the main line conductor 11, the current detection conductor 12, and the inductor element configured of coil conductors 13B and 14B.

The inductor module 1D differs from the inductor module 1 with regard to the configuration of the coil conductors 13B and 14B. The coil openings of the coil conductors 13B and 14B overlap the coil opening of the current detection conductor 12 in plan view. That is to say, the entire structures of the coil conductors 13B and 14B do not have to fit inside the coil opening of the current detection conductor 12.

Figure 15A:
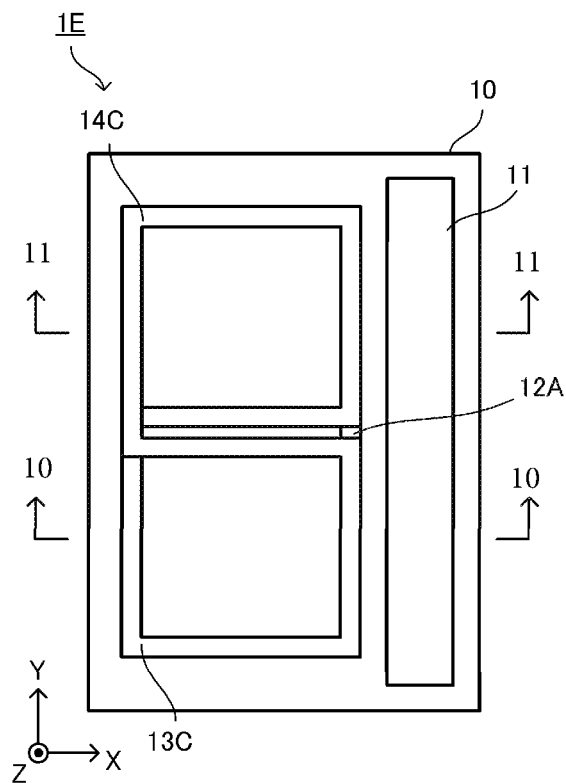
FIG. 15(A) is a plan view of an inductor module according to another example.
Figure 15B:
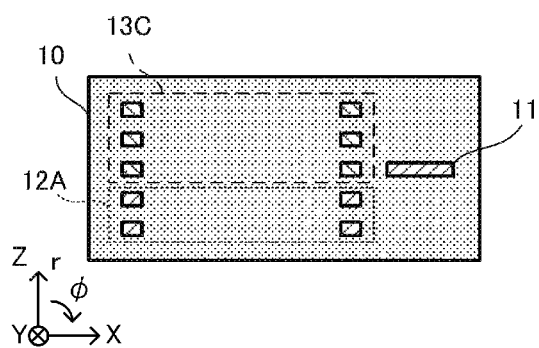
FIG. 15(B) is a cross-sectional view taken along line 10-10 in FIG. 15(A)
Figure 15C:
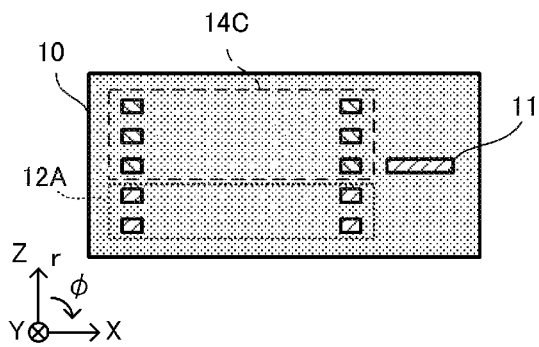
FIG. 15(C) is a cross-sectional view taken along line 11-11 in FIG. 15(A).
Figure 16:
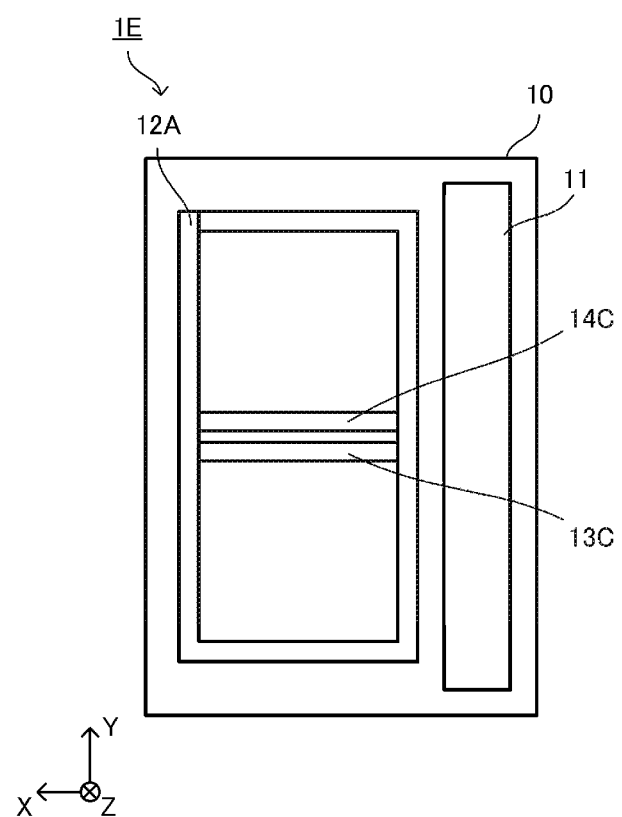
FIG. 16 is a plan view of an inductor module according to another example.

FIG. 15(A) and FIG. 16 are plan views of an inductor module 1E according to another example, FIG. 15(B) is a cross-sectional view taken along line 10-10 in FIG. 15(A), and FIG. 15(C) is a cross-sectional view taken along line 11-11 in FIG. 15(A). Note that FIG. 15(A) is a plan view of the upper face of the laminate 10 (the positive-side surface of the laminate 10 in the Z direction) in the laminated direction (Z direction) of the laminate 10, and FIG. 16 is a plan view of the lower face of the laminate 10 (the negative-side surface of the laminate 10 in the Z direction) in the laminated direction (Z direction) of the laminate 10.

The inductor module 1E differs from the inductor module with regard to the configuration of current detection conductor 12A and coil conductors 13C and 14C. The current detection conductor 12A and coil conductors 13C and 14C are formed overlaid in plan view. More particularly, the current detection conductor 12A is formed on the lower side of the laminate 10 in the laminating direction. The coil conductors 13C and 14C are formed above the current detection conductor 12A in the laminating direction of the laminate 10. Overlaying the current detection conductor 12A and coil conductors 13C and 14C enables the inductor module 1E to be reduced in size. Note that the current detection conductor 12A may be formed on the upper side of the laminate 10 in the laminating direction, and the coil conductors 13C and 14C may be formed on the lower side of the laminate 10 in the laminating direction.

Figure 17A:
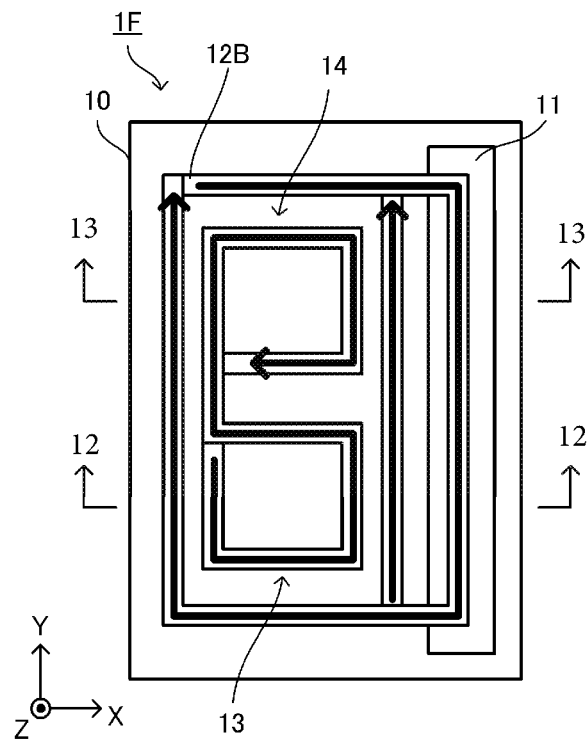
FIG. 17(A) is a plan view of an inductor module according to another example.
Figure 17B:
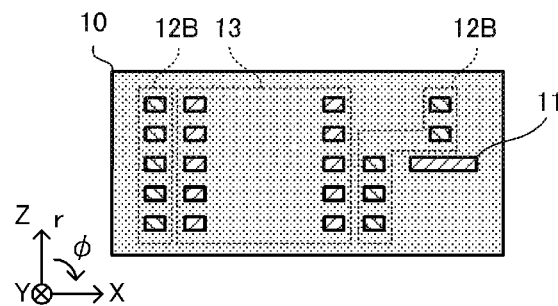
FIG. 17(B) is a cross-sectional view taken along line 12-12 in FIG. 17(A)
Figure 17C:
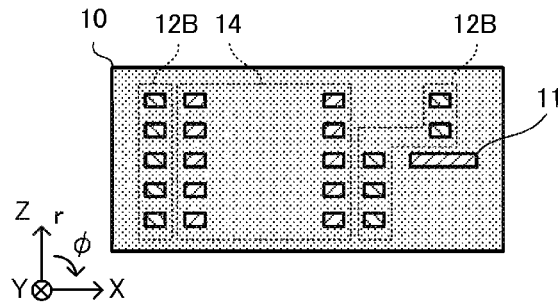
FIG. 17(C) is a cross-sectional view taken along line 13-13 in FIG. 17(A).

FIG. 17(A) is a plan view of an inductor module 1F according to another example, FIG. 17(B) is a cross-sectional view taken along line 12-12 in FIG. 17(A), and FIG. 17(C) is a cross-sectional view taken along line 13-13 in FIG. 17(A). Note that the arrows in FIG. 17(A) indicate the directions of currents flowing through the current detection conductor 12B and the inductor element configured of coil conductors 13 and 14.

The inductor module 1F differs from the inductor module with regard to the configuration of current detection conductor 12B. The current detection conductor 12B is formed partially overlapping the main line conductor 11 in plan view. Accordingly, the current detection conductor 12B can be formed larger, and current detection sensitivity can be improved by increasing the inductance of the current detection conductor 12 and the coupling with the main line conductor 11 being stronger. Note that the main line conductor 11 preferably does not divide the coil opening of the current detection conductor 12 in plan view of the coil opening of the current detection conductor 12. If the main line conductor 11 divides the coil opening of the current detection conductor 12, there will be magnetic fluxes generated by the current flowing through the main line conductor 11 and interlinking with the coil opening of the current detection conductor 12 that have mutually opposite interlinking directions, which will impede magnetic coupling between the main line conductor 11 and current detection conductor 12.

Figure 18A:
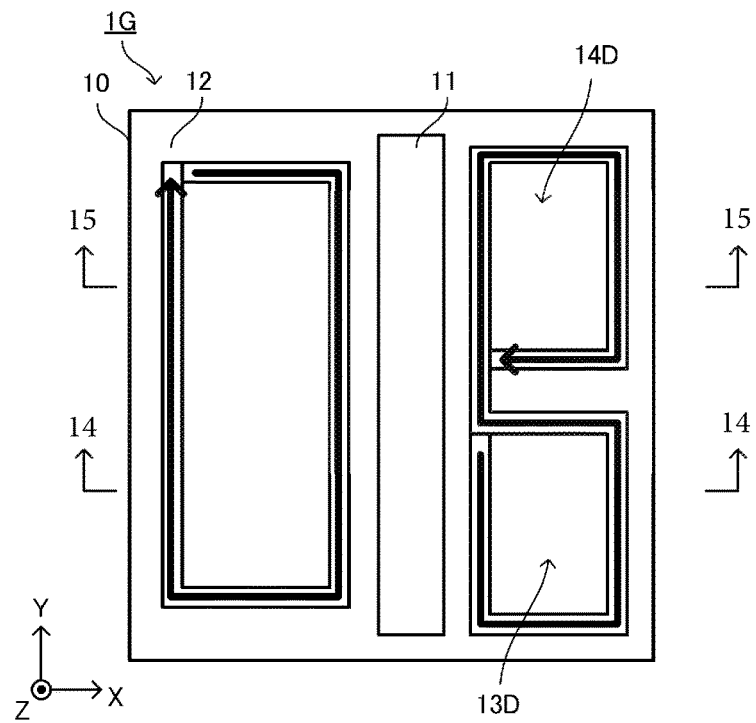
FIG. 18(A) is a plan view of an inductor module according to another example.
Figure 18B:
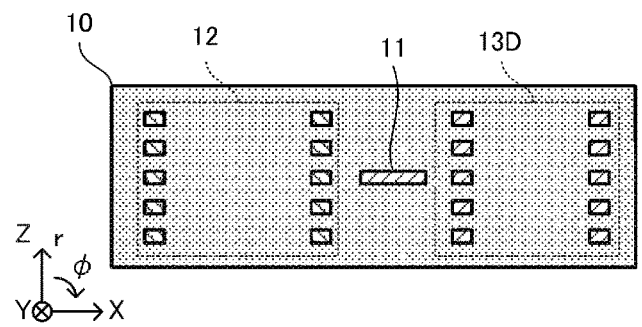
FIG. 18(B) is a cross-sectional view taken along line 14-14 in FIG. 18(A)
Figure 18C:
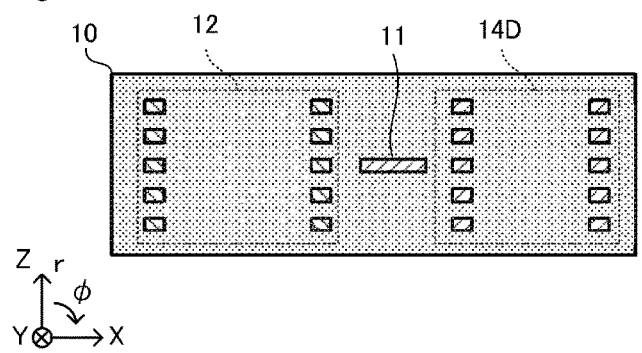
FIG. 18(C) is a cross-sectional view taken along line 15-15 in FIG. 18(A).

FIG. 18(A) is a plan view of an inductor module 1G according to another example, FIG. 18(B) is a cross-sectional view taken along line 14-14 in FIG. 18(A), and FIG. 18(C) is a cross-sectional view taken along line 15-15 in FIG. 18(A). Note that the arrows in FIG. 18(A) indicate the directions of currents flowing through the current detection conductor 12 and the inductor element configured of coil conductors 13D and 14D.

The inductor module 1G differs from the inductor module 1 with regard to the configuration of the coil conductors 13D and 14D. The coil conductors 13D and 14D are formed at positions across the main line conductor 11, on the opposite side from the current detection conductor 12. In this case as well, the coupling between the current detection conductor 12 and the coil conductor 13D, and the coupling between the current detection conductor 12 and the coil conductor 14D, are such that one is positive coupling and the other is negative coupling, so the inductor element configured of the coil conductors 13D and 14D functions as an independent inductor element.

This configuration enables the coil conductors 13D and 14D to be formed larger in size, so the inductance of the inductor element configured of the coil conductors 13D and 14D can be larger. The main line conductor 11 has a shielding function of distancing the current detection conductor 12 and the coil conductors 13D and 14D from each other, and also impeding electromagnetic coupling (particularly electric coupling) between the current detection conductor 12 and the coil conductors 13D and 14D. Thus, interaction between the current detection conductor 12 and the coil conductors 13D and 14D can be suppressed.

Although the above-described inductor modules are configurations including two coil conductors, the number of coil conductors may be changed as appropriate.

Figure 19:
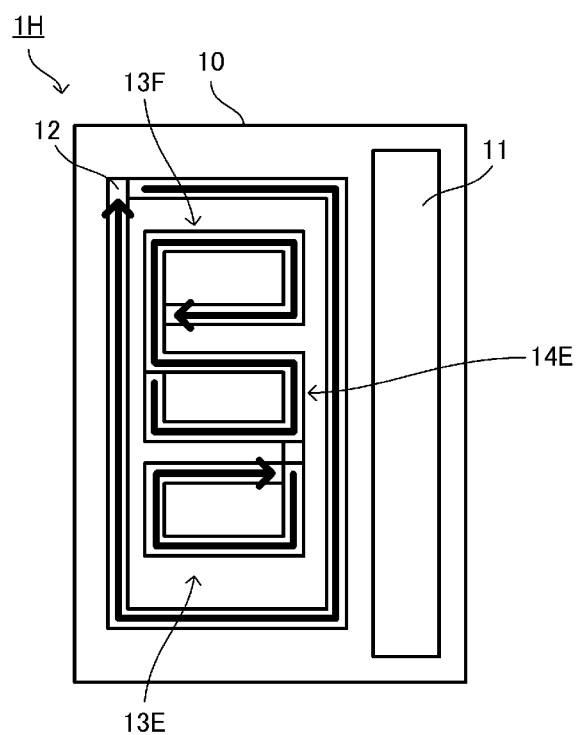
FIG. 19 is a diagram illustrating an inductor module including three coil conductors.

FIG. 19 is a diagram illustrating an inductor module 1H including three coil conductors. The arrows in FIG. 19 indicate the directions of currents flowing through the current detection conductor 12 and the inductor element configured of coil conductors 13E, 13F, and 14E.

The inductor module 1H has the coil conductors 13E, 13F, and 14E. In plan view of the coil openings of the coil conductors 13E and 14E, the coil conductors 13E and 14E are formed and connected such that currents flowing circling in opposite directions from each other do not cancel each other out (intensify each other), and currents flowing circling in the same direction cancel each other out (weaken each other), and are connected at the lower face side of the laminate 10 (negative-side laminate 10 surface in the Z direction). Also, in plan view of the coil openings of the coil conductors 13F and 14E, the coil conductors 13F and 14E are formed and are connected at the upper face side of the laminate 10 (positive-side laminate 10 surface in the Z direction), such that currents flowing circling in opposite directions from each other do not cancel each other out (intensify each other), and currents flowing circling in the same direction cancel each other out (weaken each other). Accordingly, the coil conductors 13E, 13F, and 14E are mutually connected and make up a single inductor element.

In this case, with regard to the coupling between the main line conductor 11 and coil conductors 13E and 13F, and the coupling between the main line conductor 11 and the coil conductor 14E, one is positive coupling and the other is negative coupling. As a result, the couplings cancel each other out, so the main line conductor 11 and the single inductor element configured of the coil conductors 13E, 13F, and 14E are not magnetically coupled (or magnetic coupling is weak). In the same way, with regard to the coupling between the current detection conductor 12 and coil conductors 13E and 13F, and the coupling between the main line conductor 11 and the coil conductor 14E, one is positive coupling and the other is negative coupling. As a result, the couplings cancel each other out, so the current detection conductor 12 and the single inductor element configured of the coil conductors 13E, 13F, and 14E are not magnetically coupled (or magnetic coupling is weak). In this way, the number of coil conductors may be three (or more) as long as magenta coupling is balanced (positive coupling and negative coupling).

Embodiment 2

Figure 20A:
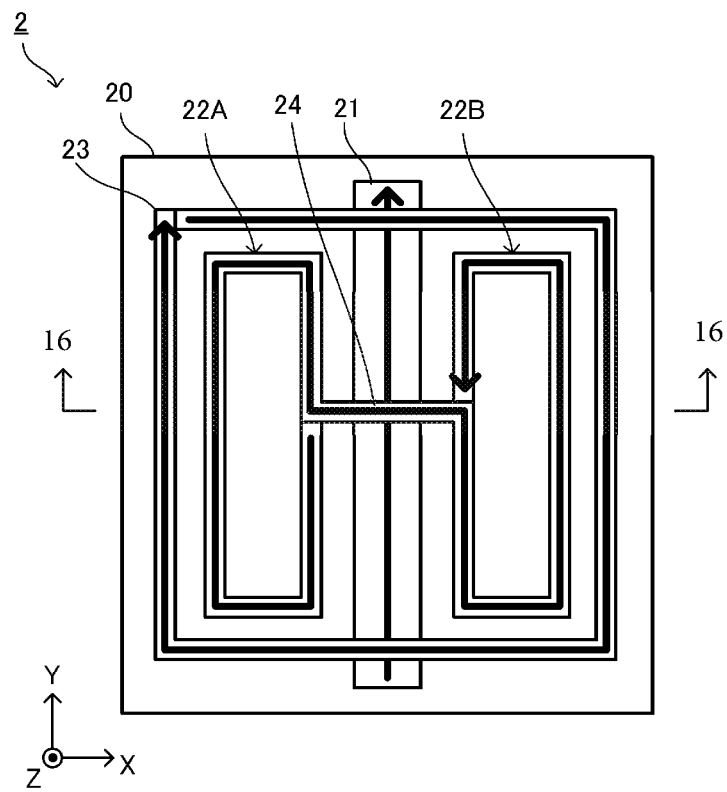
FIG. 20(A) is a plan view of an inductor module according to Embodiment 2.
Figure 20B:
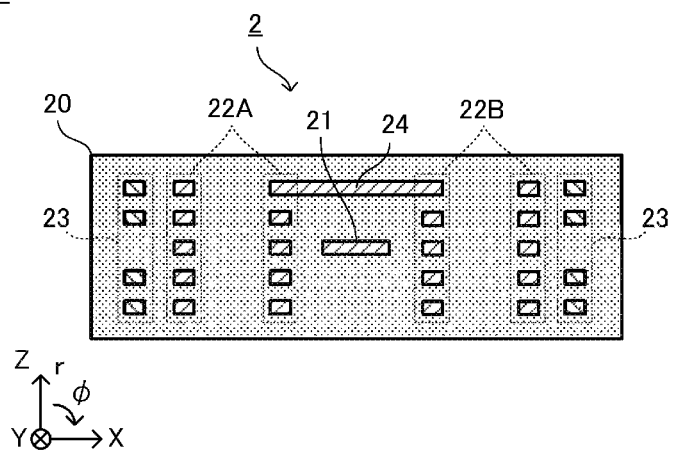
FIG. 20(B) is a cross-sectional view taken along line 16-16 in FIG. 20(A).

FIG. 20(A) is a plan view of an inductor module 2 according to Embodiment 2, and FIG. 20(B) is a cross-sectional view taken along line 16-16 in FIG. 20(A). Note that the plan view in FIG. 20A is a transparent view. Also, the arrows in FIG. 20(A) indicate the directions of currents flowing through a main line conductor 21, current detection conductors 22A and 22B, and an inductor element configured of a coil conductor 23.

The inductor module 2 has a laminate 20 formed by laminating multiple ferrite sheets, and integrally sintering the multiple ferrite sheets. The main line conductor 21 of which the main portion is in the form of a straight line and is long in one direction (Y direction) is formed on the main surface of one ferrite sheet of the laminate 20, and current flows in one direction (Y direction) through the main line conductor 21. The main line conductor 21, may be formed as an arrangement where straight-line conductor patterns printed on multiple ferrite sheets are connected in parallel with each other by inter-layer connecting conductors as illustrated in FIG. 1. In this case, the inductance component and resistance component of the main line conductor 21 can be reduced.

The inductor module 2 has the current detection conductors 22A and 22B. The winding axes of the current detection conductors 22A and 22B are in the laminating direction of the laminate 20, and are formed to sandwich the main line conductor 21 in plan view of the coil openings of the current detection conductors 22A and 22B. The current detection conductor 22A is formed by open-loop conductors formed on the main surface of different layers of ferrite sheets being connected by inter-layer connection conductors (not illustrated). Similarly, the current detection conductor 22B also is formed by open-loop conductors formed on the main surface of different layers of ferrite sheets being connected by inter-layer connection conductors (not illustrated). Accordingly, in a cylindrical coordinate system with the main line conductor 21 as the axis thereof, where the direction in which the current of the main line conductor 21 flows (Y direction) is the axial direction, the winding axes of the current detection conductors 22A and 22B are in the circumferential direction (φ direction) or on a straight line (Z direction) that is tangent to the circumferential direction.

One end at the lower side of the current detection conductors 22A and 22B is connected to mounting electrodes at the lower face of the laminate 20. One end at the upper side of the current detection conductors 22A and 22B is connected to each other by a connecting conductor 24. The connecting conductor 24 is formed on the main surface of a ferrite sheet, straddling the upper side (positive side in the Z direction) of the main line conductor 21. The current detection conductors 22A and 22B form a single coil by being serially connected by the connecting conductor 24.

The current detection conductor 22A is an example of a "first detection coil conductor" according to the present disclosure. The current detection conductor 22B is an example of a "second detection coil conductor" according to the present disclosure.

Note that the connecting conductor 24 may be formed at a layer distanced from the main line conductor 21. In this case, parasitic capacitance between the connecting conductor 24 and the main line conductor 21 can be reduced.

The inductor module 2 has the coil conductor 23. The winding axis of the coil conductor 23 is in the laminating direction of the laminate 20, and the coil conductor 23 is formed surrounding the current detection conductors 22A and 22B on its inner side in plan view of the coil opening of the coil conductor 23. The coil conductor 23 also is laid out with respect to the main line conductor 21 so that the coil opening is bisected by the main line conductor 21. The winding axis of the coil conductor 23 extends in the laminating direction (Z direction) of the laminate 20, and intersects the main line conductor 21. In other words, the current detection conductors 22A and 22B have their winding axes in the radial direction (r direction) in the cylindrical coordinate system where the main line conductor 21 is an axis, and the direction in which the current flows through the main line conductor 21 (Y direction) is the axial direction.

When current flows through the main line conductor 21 in the inductor module 2 formed in this way, a magnetic flux of which the direction is the circumferential direction (φ direction) is generated around the main line conductor 21. This magnetic flux passes through the coil openings of the current detection conductors 22A and 22B, whereby the main line conductor 21 and the current detection conductors 22A and 22B are magnetically coupled. More specifically, at one of the current detection conductors 22A and 22B, magnetic flux from the main line conductor 21 interlinks from the upper side of the coil opening toward the lower side (negative direction in the Z direction), and at the other, magnetic flux from the main line conductor 21 interlinks from the lower side of the coil opening toward the upper side (positive direction in the Z direction). The magnetic coupling between the main line conductor 21 and the current detection conductors 22A and 22B generates induced electromotive force in the current detection conductors 22A and 22B, and induced current flows through the current detection conductors 22A and 22B, in accordance with the induced electromotive force.

The current detection conductors 22A and 22B are formed and connected such that, in plan view of the coil openings of the current detection conductors 22A and 22B, currents flowing circling in opposite directions from each other do not cancel each other out (intensify each other), and currents flowing circling in the same direction cancel each other out (weaken each other). Now, the relationship between the configurations of the current detection conductor 22A and current detection conductor 22B is the same as the relationship between the configurations of the coil conductor 13 and coil conductor 14 in FIG. 5, FIG. 6, and FIG. 7. Accordingly, the magnetic coupling between the main line conductor 21 and the current detection conductors 22A and 22B does not weaken.

The magnetic flux generated by current flowing through the main line conductor 21 also passes through the coil opening of the coil conductor 23. However, the winding axis of the coil conductor 23 intersects the main line conductor 21, so the main line conductor 21 bisects the coil opening of the coil conductor 23, in plan view of the coil opening of the coil conductor 23, and the main line conductor 21 and the coil conductor 23 are not magnetically coupled (or magnetic coupling is weak).

Figure 21:
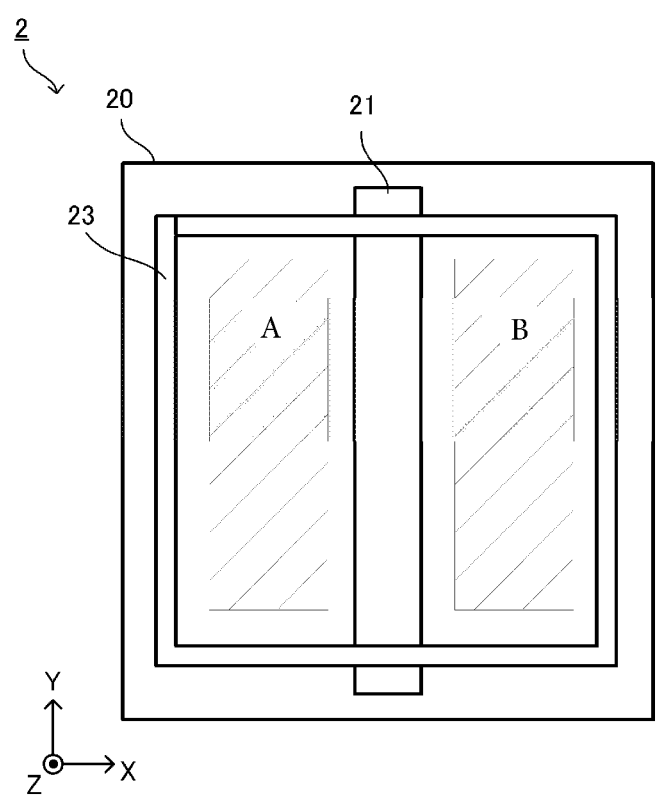
FIG. 21 is a diagram for describing the reason why the main line conductor and coil conductor are not magnetically coupled (or magnetic coupling is weak).

FIG. 21 is a diagram for describing the reason why the main line conductor 21 and the coil conductor 23 are not magnetically coupled (or magnetic coupling is weak). Note that the current detection conductors 22A and 22B are not illustrated in FIG. 21.

One side of the coil opening of the coil conductor 23 divided by the main line conductor 21 is region A, and the other is region B. In a case where current flows through the main line conductor 21, a magnetic flux heading from the lower side of the coil opening of the coil conductor 23 toward the upper side (positive direction in the Z direction) passes through one of the regions A and B, and a magnetic flux heading from the upper side of the coil opening of the coil conductor 23 toward the lower side (negative direction in the Z direction) passes through the other. That is to say, the directions of the magnetic fluxes passing through the regions A and B are opposite from each other. Also, regions A and B have the same area, so the number of magnetic fluxes passing through is the same. Accordingly, the number of interlinkages between the coil opening of the coil conductor 23 and the magnetic fluxes generated by current flowing through the main line conductor 21 cancel each other out. As a result, the main line conductor 21 and the coil conductor 23 are not magnetically coupled (or magnetic coupling is weak).

Also, the current detection conductors 22A and 22B are formed within the coil opening of the coil conductor 23, so the current detection conductors 22A and 22B and the coil conductor 23 are not magnetically coupled (or magnetic coupling is weak). The relationship in configuration between the current detection conductors 22A and 22B and the coil conductor 23 is the same as the relationship in configuration between the coil conductors 13 and 14 and the current detection conductor 12 in FIG. 1. That is to say, in the relationship of the magnetic coupling between the current detection conductors 22A and 22B and the coil conductor 23, the current detection conductors 22A and 22B correspond to the coil conductors 13 and 14, and the coil conductor 23 corresponds to the current detection conductor 12. Accordingly, one of the current detection conductor 22A and coil conductor 23, and current detection conductor 22B and coil conductor 23, is positively coupled and the other is negatively coupled, so the current detection conductors 22A and 22B and the coil conductor 23 are not magnetically coupled (or magnetic coupling is weak).

As described above, current flows through the main line conductor 21 in the inductor module 2, and the current flowing through the main line conductor 21 can be detected by detecting induced current (or induced electromotive force) generated at the current detection conductors 22A and 22B magnetically coupled with the main line conductor 21. The coil conductor 23 can also be used as an inductor element. That is to say, an inductor module 2 that has a current detection element and an inductor element at the same time can be realized.

In the inductor module 2, the current detection conductors 22A and 22B are laid out symmetrically across the main line conductor 21 at the center, so even if shifting in layers occurs when laminating insulator layers to manufacture the laminate 20, and the distance between the main line conductor 21 and the current detection conductor 22A becomes greater, the distance between the main line conductor 21 and the current detection conductor 22B becomes smaller. That is to say, even if the magnetic coupling between the main line conductor 21 and the current detection conductor 22A becomes weaker, the magnetic coupling between the main line conductor 21 and the current detection conductor 22B becomes stronger. The current detection conductors 22A and 22B are serially connected, forming a single coil conductor.

Accordingly, even if shifting in layers of ferrite sheets occurs, the magnetic coupling between the main line conductor 21 and the two current detection conductors 22A and 22B is almost unchanged.

With regard to the positional relationship between the current detection conductors 22A and 22B in the present embodiment, the magnetic coupling between the current detection conductor 22A and current detection conductor 22B is laid out so as to raise the inductance of the current detection conductors 22A and 22B. That is to say, a greater inductance can be obtained as compared to a case of simply serially connecting the current detection conductors 22A and 22B. Thus, current detection sensitivity can be raised even higher.

An inductor module according to another configuration will be described below.

Figure 22A:
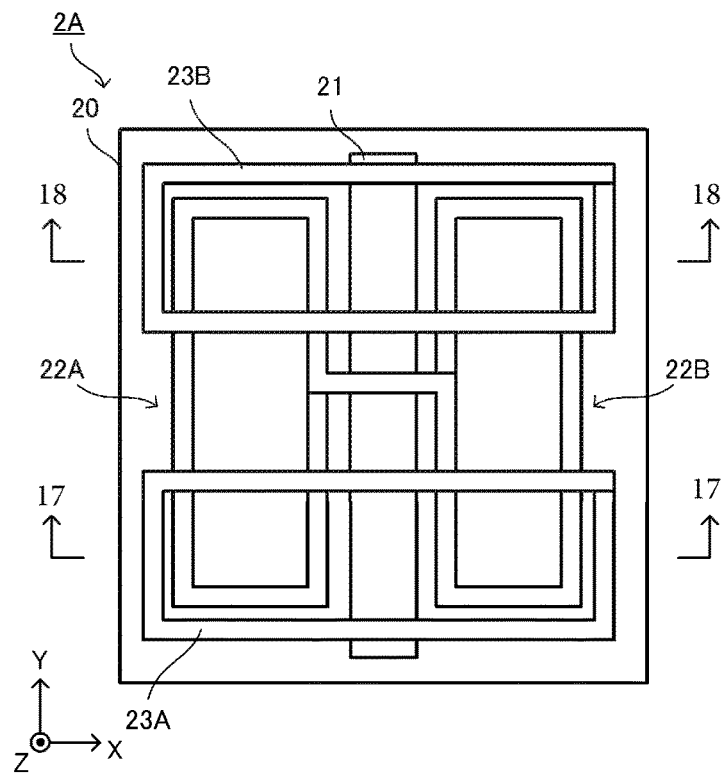
FIG. 22(A) is a plan view of an inductor module according to another example.
Figure 22B:
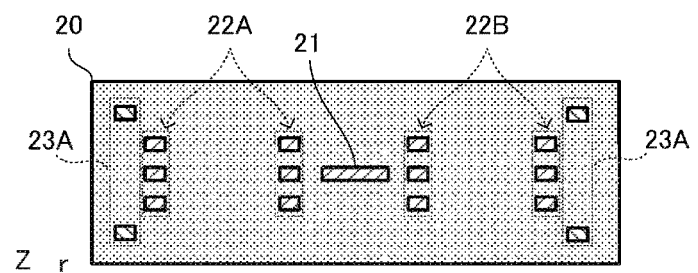
FIG. 22(B) is a cross-sectional view taken along line 17-17 in FIG. 22(A)
Figure 22C:
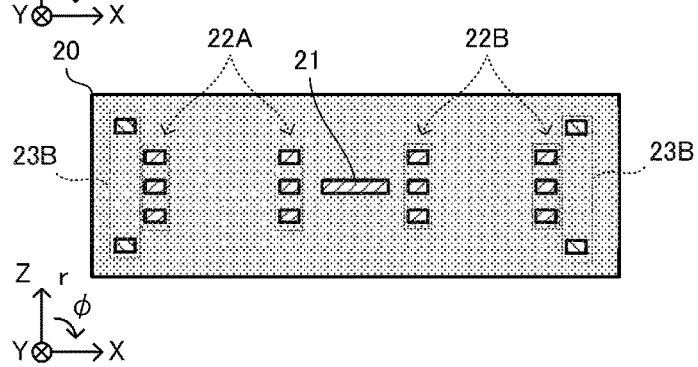
FIG. 22(C) is a cross-sectional view taken along line 18-18 in FIG. 22(A).

FIG. 22(A) is a plan view of an inductor module 2A according to another example, FIG. 22(B) is a cross-sectional view taken along line 17-17 in FIG. 22(A), and FIG. 22(C) is a cross-sectional view taken along line 18-18 in FIG. 22(A).

The inductor module 2A differs from the inductor module 2 with regard to the configuration of coil conductors 23A and 23B. The coil conductors 23A and 23B are laid out along the direction in which current flows through the main line conductor (Y direction) and are serially connected, thereby making up a single inductor element. In a cylindrical coordinate system with the main line conductor 21 as the axis thereof, where the direction in which the current of the main line conductor 21 flows (Y direction) is the axial direction, the winding axes of the coil conductors 23A and 23B are in the radial direction (r direction), so the coil openings of each of the coil conductors 23A and 23B are bisected by the main line conductor 21 in plan view. In this case as well, the main line conductor 21 and the coil conductor 23A are not magnetically coupled (or magnetic coupling is weak), and the main line conductor 21 and the coil conductor 23B are not magnetically coupled (or magnetic coupling is weak), in the same way as described with respect to FIG. 21. Also, the current detection conductors 22A and 22B, and the coil conductors 23A and 23B are not magnetically coupled (or magnetic coupling is weak).

Note that in this example, the coil openings of the coil conductors 23A and 23B are bisected by the main line conductor 21. The area where one of the two regions and the current detection conductor 22A overlap, and the area where the other of the two regions and the current detection conductor 22B overlap, are equal. Accordingly, the magnetic fluxes passing through the two regions are equal, and cancel each other out. Accordingly, even without restricting the direction of induced current flowing through the coil conductors 23A and 23B, the current detection conductors 22A and 22B, and the coil conductors 23A and 23B are not magnetically coupled (or magnetic coupling is weak). Thus, the method of connecting the coil conductor 23A and the coil conductor 23B is not restricted. However, in a case of connecting so that current flows circling in the opposite directions between the coil conductor 23A and the coil conductor 23B in plan view of the coil openings of the coil conductors 23A and 23B, magnetic coupling between the coil conductor 23A and coil conductor 23B will be in a layout that increases the inductance of the coil conductors 23A and 23B. Accordingly, the inductance of the inductor element configured of the coil conductors 23A and 23B can be increased.

Figure 23A:
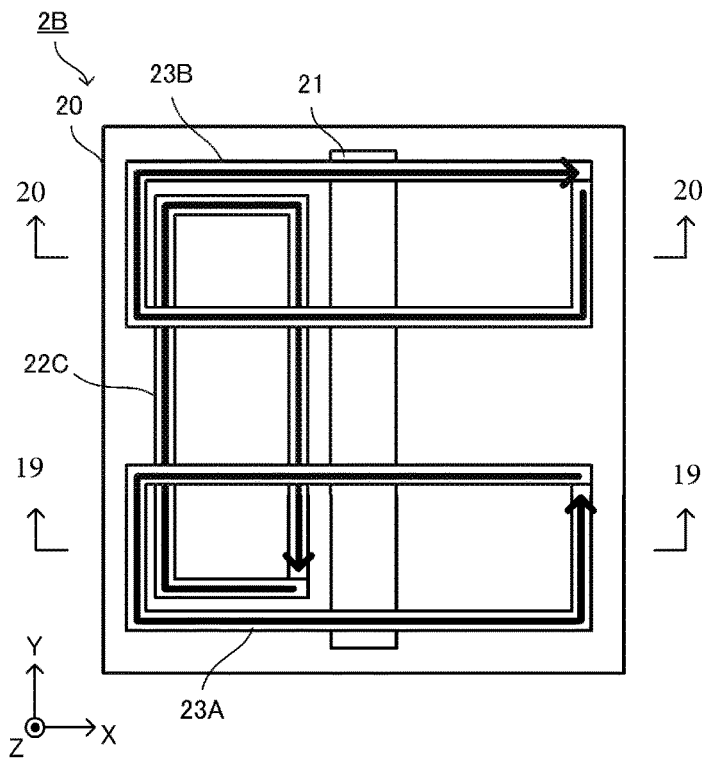
FIG. 23(A) is a plan view of an inductor module according to another example.
Figure 23B:
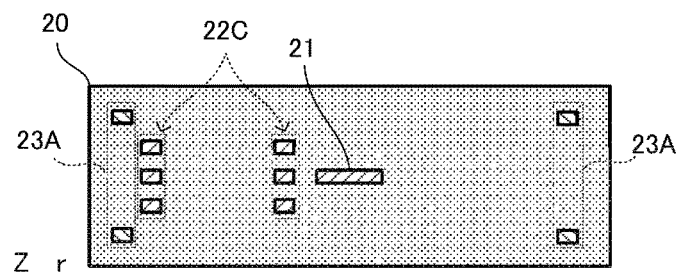
FIG. 23(B) is a cross-sectional view taken along line 19-19 in FIG. 23(A)
Figure 23C:
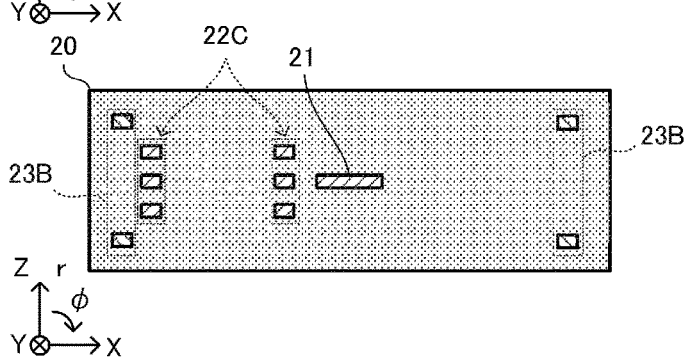
FIG. 23(C) is a cross-sectional view taken along line 20-20 in FIG. 23(A).

FIG. 23(A) is a plan view of an inductor module 2B according to another example, FIG. 23(B) is a cross-sectional view taken along line 19-19 in FIG. 23(A), and FIG. 23(C) is a cross-sectional view taken along line 20-20 in FIG. 23(A). The arrows in FIG. 23(A) indicate the directions of currents flowing through a main line conductor 21, a current detection conductor 22C, and the inductor element configured of the coil conductors 23A and 23B.

The inductor module 2B differs from the inductor module 2A illustrated in FIG. 22(A) and so forth with regard to the configuration of the current detection conductor 22C. In plan view of the coil opening of the current detection conductor 22C, the current detection conductor 22C is disposed adjacent to the main line conductor 21 across a gap. The coil conductors 23A and 23B are configured the same as in the description of FIG. 22(A) and so forth, but are formed and connected such that, in plan view of the coil openings of the coil conductors 23A and 23B, currents flowing circling in opposite directions from each other do not cancel each other out (intensify each other), and currents flowing circling in the same direction cancel each other out (weaken each other).

In this case as well, the main line conductor 21 and the coil conductors 23A and 23B are not magnetically coupled (or coupling is weak), as in the description of FIG. 22(A) and so forth.

Also, in this case as well, one of the current detection conductor 22C and coil conductor 23A, and current detection conductor 22C and coil conductor 23B, is positively coupled and the other is negatively coupled, so the current detection conductor 22C and coil conductor 23A and 23B are not magnetically coupled (or magnetic coupling is weak), the same as in the description of FIG. 1, FIG. 14, and so forth, in Embodiment 1.

Figure 24A:
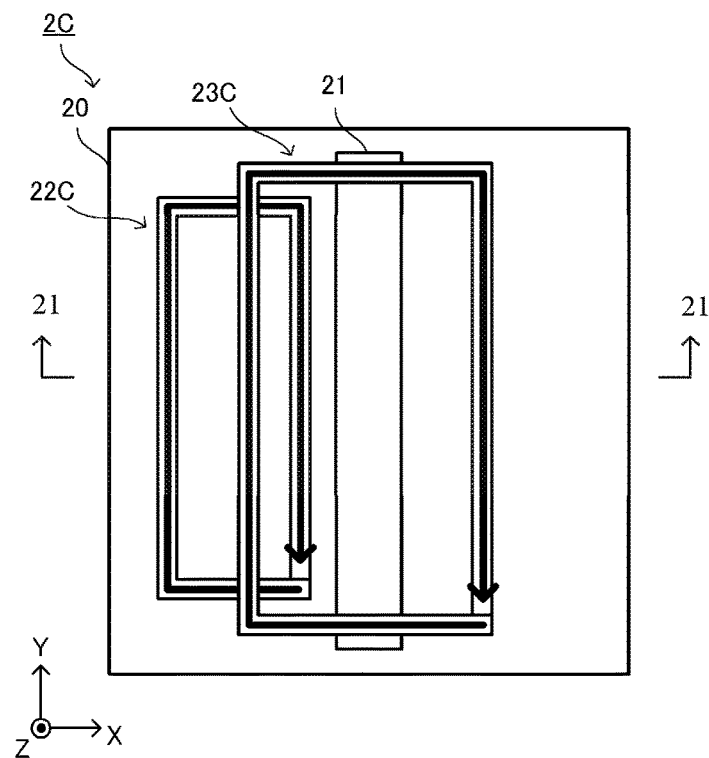
FIG. 24(A) is a plan view of an inductor module according to another example.
Figure 24B:
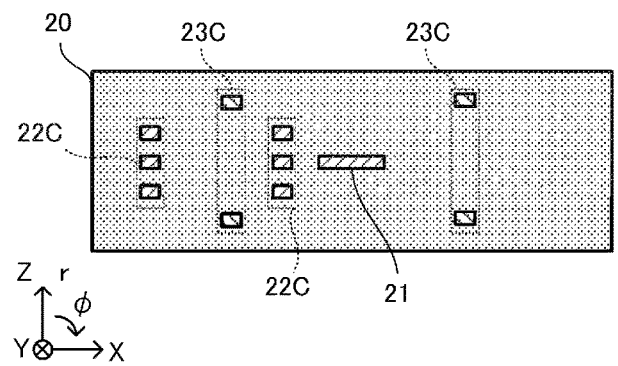
FIG. 24(B) is a cross-sectional view taken along line 21-21 in FIG. 24(A).

FIG. 24(A) is a plan view of an inductor module 2C according to another example, and FIG. 24(B) is a cross-sectional view taken along line 21-21 in FIG. 24(A). The arrows in FIG. 24(A) indicate the directions of currents flowing through the current detection conductor 22C, and an inductor element configured of a coil conductor 23C.

The inductor module 2C differs from the inductor module 2B illustrated in FIG. 23(A) and so forth with regard to the configuration of the coil conductor 23C. The coil conductor 23C is laid out as to the main line conductor 21 such that, in a cylindrical coordinate system with the main line conductor 21 as the axis thereof, where the direction in which the current of the main line conductor 21 flows (Y direction) is the axial direction, the winding axis of the coil conductor 23C is in the radial direction (r direction), so the coil opening of the coil conductor 23C is divided by the main line conductor 21 in plan view. The winding axis of the coil conductor 23C intersects the main line conductor 21 here. Also, in plan view of the coil opening of the coil conductor 23C, part of the coil conductor 23C is configured to divide the coil opening of the current detection conductor 22C.

In the same way as in the description of FIG. 20 and so forth, the main line conductor 21 and the coil conductor 23C are not magnetically coupled (or coupling is weak). Also, the current detection conductor 22C and the coil conductor 23C are not magnetically coupled (or magnetic coupling is weak).

Figure 25:
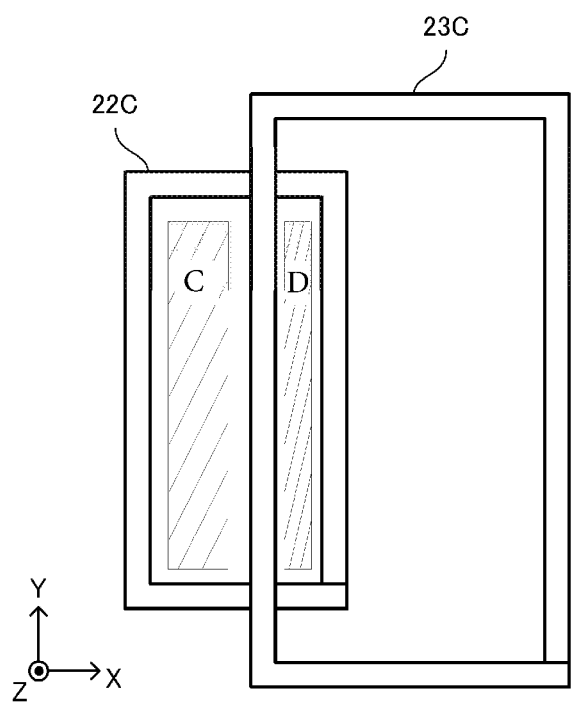
FIG. 25 is a diagram for describing the reason why the current detection conductor and coil conductor are not magnetically coupled (or magnetic coupling is weak).

FIG. 25 is a diagram for describing the reason why the current detection conductor 22C and coil conductor 23C are not magnetically coupled (or magnetic coupling is weak). Note that the laminate 20 and main line conductor 21 are not illustrated in FIG. 25.

One side of the coil opening of the current detection conductor 22C divided by the coil conductor 23C is region C, and the other is region D. In a case where magnetic fluxes are generated around the coil conductor 23C by current flowing through the coil conductor 23C, a magnetic flux passes through one of the regions C and D from the lower side of the coil opening of the coil conductor 23C heading upwards (positive direction in the Y direction), and a magnetic flux passes through the other from the upper side of the coil opening of the coil conductor 23C heading downwards (negative direction in the Y direction). That is to say, the directions of magnetic fluxes passing through the regions C and D are opposite directions to each other. Accordingly, the magnetic fluxes cancel each other out within the coil openings of the current detection conductor 22C. As a result, the current detection conductor 22C and coil conductor 23C are not magnetically coupled (or coupling is weak). Note that since the magnetic flux density distribution differs between the regions C and D, the ratio of area between the region C and region D is decided so that the number of passing magnetic fluxes is the same in the region C and region D.

Figure 26A:
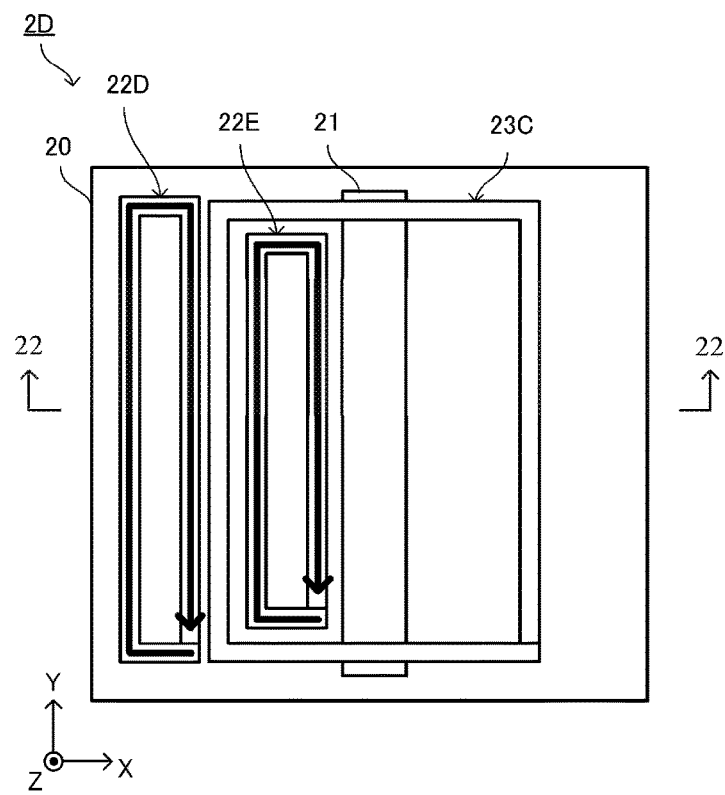
FIG. 26(A) is a plan view of an inductor module according to another example.
Figure 26B:
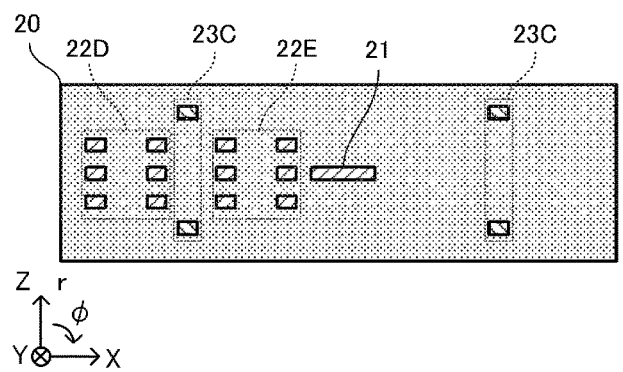
FIG. 26(B) is a cross-sectional view taken along line 22-22 in FIG. 26(A).

FIG. 26(A) is a plan view of an inductor module 2D according to another example, and FIG. 26(B) is a cross-sectional view taken along line 22-22 in FIG. 26(A). The arrows in FIG. 26(A) indicate the directions of currents flowing through the current detection conductors 22D and 22E, and the inductor element configured of a coil conductor 23C.

The inductor module 2D differs from the inductor module 2C illustrated in FIG. 24(A) and so forth with regard to the configuration of the current detection conductors 22D and 22E. The current detection conductors 22D and 22E are formed at the positions of the regions C and D described with regard to FIG. 25. The current detection conductors 22D and 22E are connected so that there is no cancellation by induced currents, as described in FIG. 22(A) and so forth. The current detection conductors 22D and 22E also are formed and connected such that, in plan view of the coil openings of the current detection conductors 22D and 22E, when current is applied to the current detection conductors 22D and 22E, currents flowing circling in opposite directions from each other do not cancel each other out (intensify each other).

For example, in a case where the winding directions of the current detection conductors 22D and 22E are opposite directions in plan view of the coil openings of the current detection conductors 22D and 22E, one upper side end each of the current detection conductors 22D and 22E are to be connected. Alternatively, one lower side end each of the current detection conductors 22D and 22E may be connected. Alternatively, in a case where the winding directions of the current detection conductors 22D and 22E are the same direction in plan view of the coil openings of the current detection conductors 22D and 22E, one upper side end of the current detection conductor 22D and one lower side end of the current detection conductor 22E are to be connected. Alternatively, one lower side end of the current detection conductor 22D and one upper side end of the current detection conductor 22E may be connected.

In this case, in a case where magnetic flux is generated from the coil conductor 23C, the directions of magnetic fluxes passing through the current detection conductors 22D and 22E are opposite directions, the same as described with regard to FIG. 25. Accordingly, one of the current detection conductor 22D and coil conductor 23C, and current detection conductor 22E and coil conductor 23C, is positively coupled and the other is negatively coupled, so the current detection conductors 22D and 22E and the coil conductor 23C are not magnetically coupled (or coupling is weak). Further, the magnetic coupling between the current detection conductors 22D and 22E and the coil conductor 23C can be further weakened by deciding and forming the area and number of winds to the current detection conductors 22D and 22E so that the number of magnetic fluxes passing through and interlinkages at the current detection conductors 22D and current detection conductors 22E are equal.

Figure 27A:
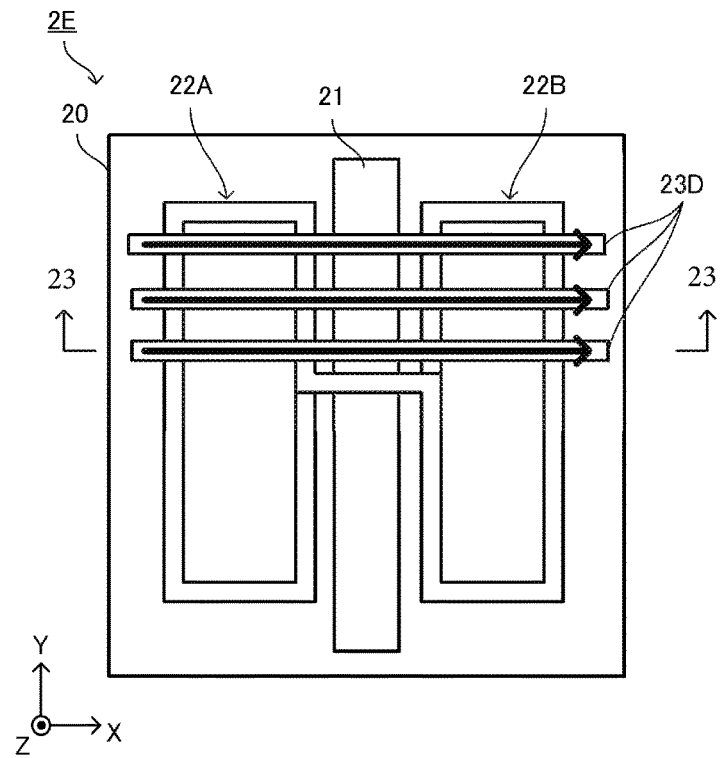
FIG. 27(A) is a plan view of an inductor module according to another example.
Figure 27B:
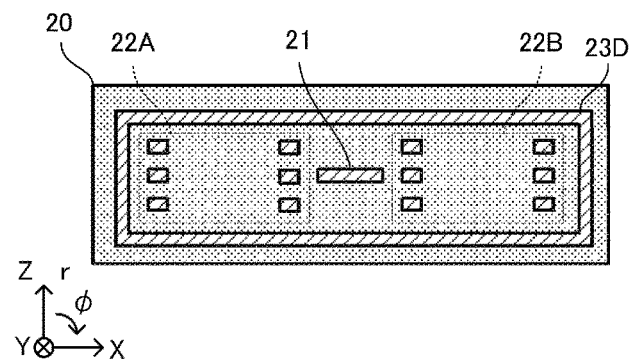
FIG. 27(B) is a cross-sectional view taken along line 23-23 in FIG. 27(A).

FIG. 27(A) is a plan view of an inductor module 2E according to another example, and FIG. 27(B) is a cross-sectional view taken along line 23-23 in FIG. 27(A). The arrows in FIG. 27(A) indicate the directions of currents flowing through current detection conductors 22A and 22B, and the inductor element configured of a coil conductor 23D.

The inductor module 2E differs from the inductor module illustrated in FIG. 20(A) and so forth with regard to the configuration of the coil conductor 23D. The coil conductor 23D is formed so that the winding axis is the direction in which current flows through the main line conductor 21 (Y direction), and so that the winding axis and the main line conductor 21 are at the same position. The current detection conductors 22A and 22B are formed at positions symmetrical as to the main line conductor 21 in the coil opening of the coil conductor 23D.

In this case, the main line conductor 21 is formed in the winding axis direction of the coil conductor 23D, so even if magnetic flux of which the direction is the circumferential direction ($\varphi$ direction) is generated around the main line conductor 21 due to current flowing through the main line conductor 21, the main line conductor 21 and coil conductor 23D are not magnetically coupled (or coupling is weak).

The current detection conductors 22A and 22B are formed and connected such that, in plan view of the coil openings of the current detection conductors 22A and 22B, currents flowing circling in opposite directions from each other do not cancel each other out (intensify each other), and currents flowing circling in the same direction cancel each other out (weaken each other). Accordingly, one of the current detection conductor 22A and coil conductor 23D, and current detection conductor 22B and coil conductor 23D, is positively coupled and the other is negatively coupled, so the current detection conductors 22A and 22B and the coil conductor 23D are not magnetically coupled (or coupling is weak). Further, the shape and layout of the coil conductor 23D is symmetrical as to the winding axis that is the center of the coil opening of the coil conductor 23D, i.e., as to the main line conductor 21, so magnetic coupling between the current detection conductors 22A and 22B and the coil conductor 23D can be weakened.

Figure 28A:
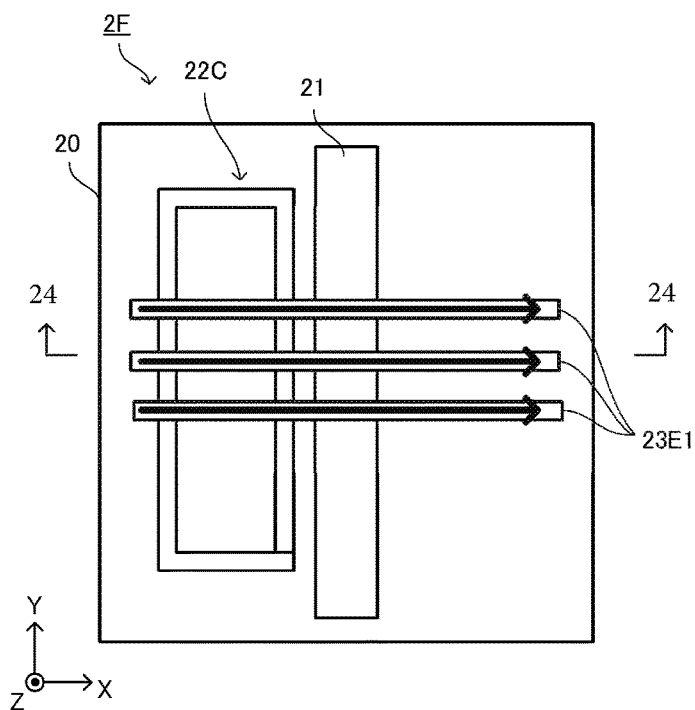
FIG. 28(A) is a plan view of an inductor module according to another example.
Figure 28B:
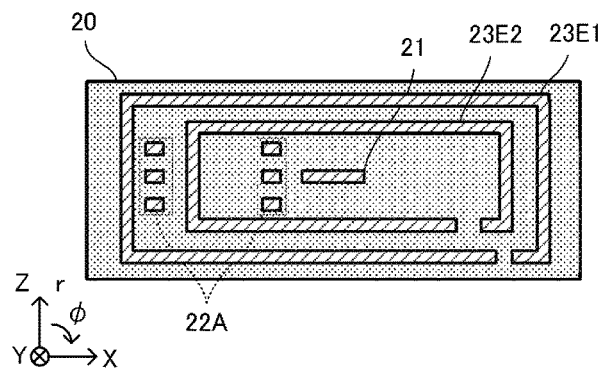
FIG. 28(B) is a cross-sectional view taken along line 24-24 in FIG. 28(A).

FIG. 28(A) is a plan view of an inductor module 2F according to another example, and FIG. 28(B) is a cross-sectional view taken along line 24-24 in FIG. 28(A). The arrows in FIG. 28(A) indicate the directions of currents flowing through the main line conductor 21, the current detection conductor 22C, and the inductor element configured of coil conductors 23E1 and 23E2.

The inductor module 2F differs from the inductor module 2E illustrated in FIG. 27(A) and so forth with regard to the configuration of the coil conductors 23E1 and 23E2. The coil conductors 23E1 and 23E2 are formed so that the winding axis is the direction in which current flows through the main line conductor 21 (Y direction), and so that the winding axis and the main line conductor 21 are at the same position. The coil diameter of the coil conductor 23E1 is larger than that of the coil conductor 23E2, with the coil conductor 23E2 being formed within the coil opening of the coil conductor 23E1 as viewed in the winding axis direction. The coil conductor 23E2 is also formed so as to pass through the coil opening of the current detection conductor 22A. One or the other of the coil conductors 23E1 and 23E2 may be omitted, and may be formed to pass either on the inner side or the outer side of the coil opening of the current detection conductor 22A.

Further, the shapes and positions of the coil conductors 23E1 and 23E2 are symmetrical as to the winding axis of the current detection conductor 22C (middle portion of the coil opening of the current detection conductor 22C). Accordingly, magnetic fluxes generated around the coil conductors 23E1 and 23E2 by current flowing through the coil conductors 23E1 and 23E2 is such that across the coil conductors 23E1 and 23E2, the number of magnetic fluxes interlinking at one side of the coil opening of the current detection conductor 22C and the number interlinking at the other side is the same number, and the direction of interlinkage is opposite. Accordingly, the coil conductors 23E1 and 23E2 and the current detection conductor 22 are not magnetically coupled (or coupling is weak). Note that multiple current detection conductors may be provided, in the same way as in FIG. 27.

Embodiment 3

Figure 29A:
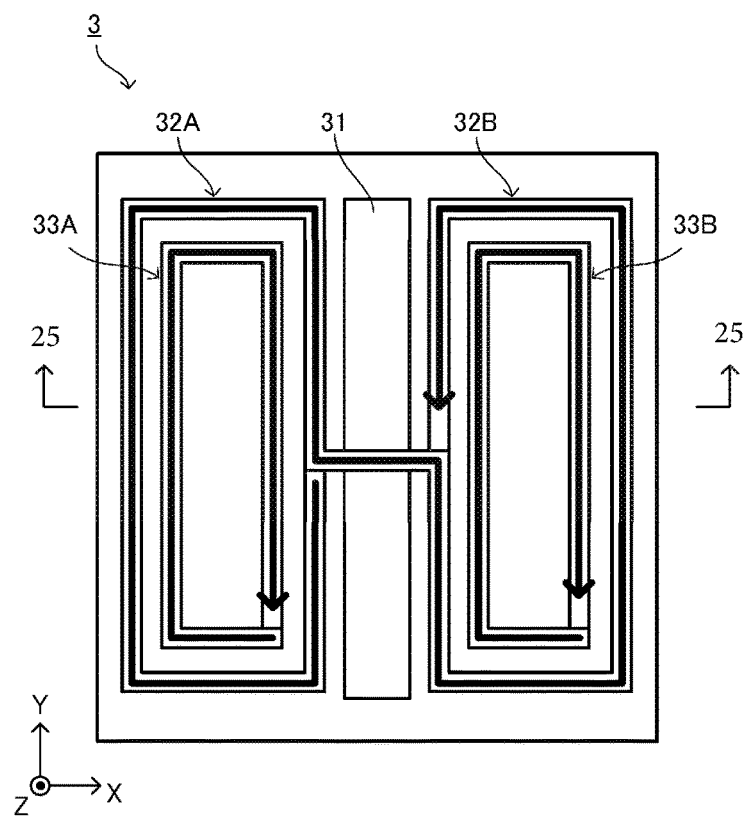
FIG. 29(A) is a plan view of an inductor module according to Embodiment 3.
Figure 29B:
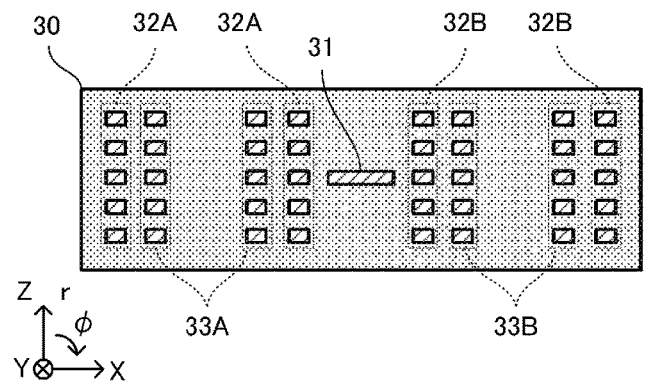
FIG. 29(B) is a cross-sectional view taken along line 25-25 in FIG. 29(A).

FIG. 29(A) is a plan view of an inductor module 3 according to Embodiment 3, and FIG. 29(B) is a cross-sectional view taken along line 25-25 in FIG. 29(A). Note that the plan view in FIG. 29(A) is a transparent view. Also, the arrows in FIG. 29(A) indicate the directions of currents flowing through a main line conductor 31, current detection conductors 32A and 32B, and a single inductor element configured of coil conductors 33A and 33B.

The inductor module 3 has a laminate 30 formed by laminating multiple ferrite sheets, and integrally sintering the multiple ferrite sheets. The main line conductor 31 of which the main portion is in the form of a straight line and is long in one direction (Y direction) is formed on the main surface of one ferrite sheet of the laminate 30, and current flows in one direction (Y direction) through the main line conductor 31. The main line conductor 31 may be an arrangement where straight-line conductor patterns printed on multiple ferrite sheets are connected in parallel with each other by inter-layer connecting conductors. In this case, the inductance component and resistance component of the main line conductor 21 can be reduced.

The inductor module 3 has the current detection conductors 32A and 32B. The winding axes of the current detection conductors 32A and 32B are in the laminating direction of the laminate 30, and formed to sandwich the main line conductor 31 in plan view of the coil openings of the current detection conductors 32A and 32B. The current detection conductors 32A and 32B are formed by open-loop conductors formed on the main surface of different layers of ferrite sheets being connected by inter-layer connection conductors (not illustrated). Accordingly, in a cylindrical coordinate system with the main line conductor 31 as the axis thereof, where the direction in which the current of the main line conductor 31 flows (Y direction) is the axial direction, the winding axes of the current detection conductors 32A and 32B are at positions in the circumferential direction ($\varphi$ direction) or on a straight line (Z direction) that is tangent to the circumferential direction.

One end at the lower side of the current detection conductors 32A and 32B is connected to mounting electrodes to mount the lower face of the laminate 30 to a motherboard. One end at the upper side of the current detection conductors 32A and 32B is connected to each other. Accordingly, the current detection conductors 32A and 32B form a single coil by being serially connected. The current detection conductors 32A and 32B are connected in the same way as the current detection conductors 22A and 22B described with regard to FIG. 20(A). That is to say, the current detection conductors 32A and 32B are formed and connected such that, in plan view of the coil openings of the current detection conductors 23A and 23B, currents flowing circling in opposite directions from each other do not cancel each other out (intensify each other), and currents flowing circling in the same direction cancel each other out (weaken each other). Thus, the magnetic coupling between main line conductor 31 and the current detection conductors 32A and 32B also is the same as that in FIG. 20(A). In the current detection conductors 32A and 32B, induced electromotive force is generated at the current detection conductors 32A and 32B due to the magnetic fluxes generated by current flowing through the main line conductor 31, and the induced currents generated in accordance with the induced electromotive force do not cancel each other out (intensify each other). The current flowing through the main line conductor 31 can be detected by detecting the induced current (or induced electromotive force).

The inductor module 3 has the coil conductors 33A and 33B. The winding axes of the coil conductors 33A and 33B are the laminating direction (Z direction) of the laminate 30, and the coil conductors 33A and 33B are located within the coil openings of the current detection conductors 32A and 32B and further formed to sandwich the main line conductor 31 in plan view of the coil openings of the coil conductors 33A and 33B. Accordingly, in a cylindrical coordinate system with the main line conductor 31 as the axis thereof, where the direction in which the current of the main line conductor 31 flows (Y direction) is the axial direction, the winding axes of the coil conductors 33A and 33B are at positions in the circumferential direction (φ direction) or on a straight line (Z direction) that is tangent to the circumferential direction. The coil conductors 33A and 33B are formed and connected such that, in plan view of the coil openings of the coil conductors 33A and 33B, currents flowing circling in opposite directions from each other do not cancel each other out (intensify each other), and currents flowing circling in the same direction cancel each other out (weaken each other). This the same as the winding direction and way of connecting as that illustrated by the current detection conductor 22D and current detection conductor 22E in FIG. 26(A).

Accordingly, the coil conductors 33A and 33B are formed so that the coupling with the main line conductor 31 are mutually opposite with regard to polarity. For example, in a case where the coil conductor 33A and the main line conductor 31 are positively coupled (the coupling coefficient is positive), the coil conductor 33B and the main line conductor 31 are negatively coupled (the coupling coefficient is negative). Alternatively, an arrangement may be made where, in a case where the coil conductor 33A and the main line conductor 31 are negatively coupled (the coupling coefficient is negative), the coil conductor 33B and the main line conductor 31 are positively coupled (the coupling coefficient is positive). Accordingly, the main line conductor 31 and the inductor element including the coil conductors 33A and 33B are not magnetically coupled (or magnetic coupling is weak).

Also, the coil conductors 33A and 33B are formed so that the coupling with the current detection conductors 32A and 32B are mutually opposite with regard to polarity. For example, the coil conductor 33A and the current detection conductor 32A are positively coupled (the coupling coefficient is positive), and the coil conductor 33B and the current detection conductor 32B are negatively coupled (the coupling coefficient is negative). Alternatively, an arrangement may be made where, the coil conductor 33A and the current detection conductor 32A are negatively coupled (the coupling coefficient is negative), and the coil conductor 33B and the current detection conductor 32B are positively coupled (the coupling coefficient is positive). In FIG. 29(A), in a case where current is applied to the current detection conductors 32A and 32B and the coil conductors 33A and 33B, in plan view of the coil openings of the current detection conductors 32A and 32B and coil conductors 33A and 33B, current applied to the coil conductor 33A and current detection conductor 32A that have mutually overlapping coil openings flows circling in the same direction, and current applied to the coil conductor 33B and current detection conductor 32B that have mutually overlapping coil openings flows circling in opposite directions from each other. Accordingly, the current detection conductors 32A and 32B and the coil conductors 33A and 33B are not magnetically coupled (or magnetic coupling is weak). Thus, the coil conductors 33A and 33B can be used as independent inductor elements.

In the inductor module 3, the current detection conductors 32A and 32B are laid out symmetrically across the main line conductor 31 at the center, so even if shifting in layers occurs when laminating insulator layers to manufacture the laminate 30, and the distance between the main line conductor 31 and the current detection conductor 32A becomes greater, the distance between the main line conductor 31 and the current detection conductor 32B becomes smaller. That is to say, even if the magnetic coupling between the main line conductor 31 and the current detection conductor 32A becomes weaker, the magnetic coupling between the main line conductor 31 and the current detection conductor 32B becomes stronger. The current detection conductors 32A and 32B are serially connected, forming a single coil conductor. Accordingly, even if shifting in layers of ferrite sheets occurs, the magnetic coupling between the main line conductor 31 and the two current detection conductors 32A and 32B is almost unchanged.

Also, the inductor module 3 has a symmetrical structure centered on the main line conductor 31, so warping at the time of laminating and sintering the ferrite sheets can be reduced. Accordingly, shift in the positional relationship between the main line conductor 31 and the current detection conductors 32A and 32B can be further suppressed.

Note that in the present embodiment, in plan view of the coil openings of the current detection conductors 32A and 32B, and coil conductors 33A and 33B, the configuration is such that the coil conductor 33A fits inside the coil opening of the current detection conductor 32A, and the coil conductor 33B fits inside the coil opening of the current detection conductor 32B. Accordingly, this provides the function of shielding, where the current detection conductors 32A and 32B distance the main line conductor 31 and the coil conductors 33A and 33B from each other, and the current detection conductors 32A and 32B impede electromagnetic coupling (particularly electric coupling) between the main line conductor 31 and the coil conductors 33A and 33B. Thus, interaction between the main line conductor 31 and the coil conductors 33A and 33B can be suppressed.

Also, the current detection conductors 32A and 32B are formed and connected such that, in plan view of the coil openings of the current detection conductors 32A and 32B, currents flowing circling in the same direction cancel each other out (weaken each other). Accordingly, even if uniform magnetic fluxes in the same direction are interlinked at the coil openings of the current detection conductors 32A and 32B, induced current does not readily flow at the current detection conductors 32A and 32B. Accordingly, the configuration of the current detection conductors 32A and 32B according to the present embodiment is a structure that is not readily influenced by external magnetic fluxes.

An inductor module according to another example will be described below.

Figure 30A:
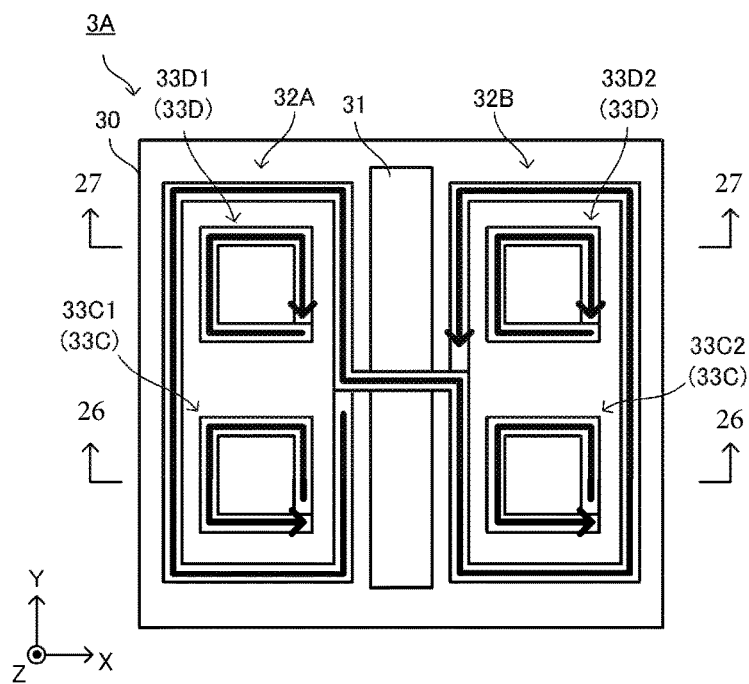
FIG. 30(A) is a plan view of an inductor module according to another example.
Figure 30B:
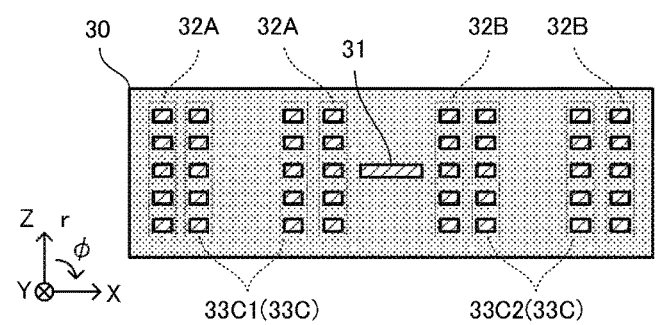
FIG. 30(B) is a cross-sectional view taken along line 26-26 in FIG. 30(A)
Figure 30C:
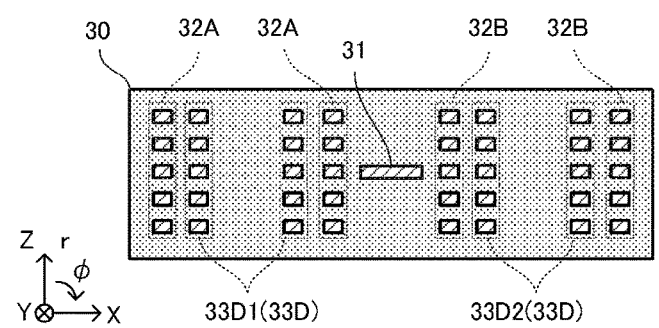
FIG. 30(C) is a cross-sectional view taken along line 27-27 in FIG. 30(A).

FIG. 30(A) is a plan view of an inductor module 3A according to another example, FIG. 30(B) is a cross-sectional view taken along line 26-26 in FIG. 30(A), and FIG. 30(C) is a cross-sectional view taken along line 27-27 in FIG. 30(A). Note that the plan view in FIG. 30(A) is a transparent view. Also, the arrows in FIG. 30(A) indicate the directions of currents flowing through two inductor elements of current detection conductors 32A and 32B, and coil conductors 33C and 33D.

The inductor module 3A differs from the inductor module 3 with regard to the configuration of the coil conductors 33C and 33D. The coil conductors 33C and 33D are independent from each other. That is to say, the inductor module 3A has two inductors (coil conductors 33C and 33D).

The coil conductor 33C is formed with a coil conductor 33C1 and a coil conductor 33C2 serially connected. In plan view of the coil openings of the coil conductors 33C1 and 33C2, the coil conductor 33C1 is located within the coil opening of the current detection conductor 32A, and the coil conductor 33C2 is located within the coil opening of the current detection conductor 32B. The coil conductors 33C1 and 33C2 are arrayed in an orthogonal direction (X direction) as to the direction in which the current of the main line conductor 31 flows (Y direction). The structures and connections of the coil conductors 33C1 and 33C2 are the same as with the coil conductors 33A and 33B in FIG. 29.

The coil conductor 33D is formed with a coil conductor 33D1 and a coil conductor 33D2 serially connected. In plan view of the coil openings of the coil conductors 33D1 and 33D2, the coil conductor 33D1 is located within the coil opening of the current detection conductor 32A, and the coil conductor 33D2 is located within the coil opening of the current detection conductor 32B. The coil conductors 33D1 and 33D2 are arrayed in an orthogonal direction (X direction) as to the direction in which the current of the main line conductor 31 flows (Y direction). The structures and connections of the coil conductors 33D1 and coil conductor 33D2 are the same as with the coil conductors 33A and 33B in FIG. 29.

In this case, the current detection conductor 32A and coil conductor 33C1 are positively coupled, and the current detection conductor 32B and coil conductor 33C2 are negatively coupled. As a result, the current detection conductors 32A and 32B and the coil conductor 33C are not magnetically coupled (or magnetic coupling is weak), in the same way as in FIG. 29. In the same way, the current detection conductors 32A and 32B and the coil conductor 33D are not magnetically coupled (or magnetic coupling is weak). Also, the main line conductor 31 and the coil conductors 33C and 33D are not magnetically coupled (or magnetic coupling is weak).

Note that the coil conductors 33C and 33D may be serially connected to form a single inductor element. In that case, with regard to the positional relationship between the coil conductors 33C1 and 33D1, the magnetic coupling between the coil conductor 33C1 and the coil conductor 33D1 is arranged so that the inductance of the coil conductors 33C1 and 33D1 is increased, by using the connection method determining the current direction the same as in the coil conductors 13 and 14 in FIG. 1. Also, with regard to the positional relationship between the coil conductors 33C2 and 33D2, the magnetic coupling between the coil conductor 33C2 and the coil conductor 33D2 is arranged so that the inductance of the coil conductors 33C2 and 33D2 is increased, by using the connection method determining the current direction the same as in the coil conductors 13 and 14 in FIG. 1. Accordingly, an inductor element having greater inductance than simply serially connecting the coil conductors 33C and 33D can be obtained.

Figure 31A:
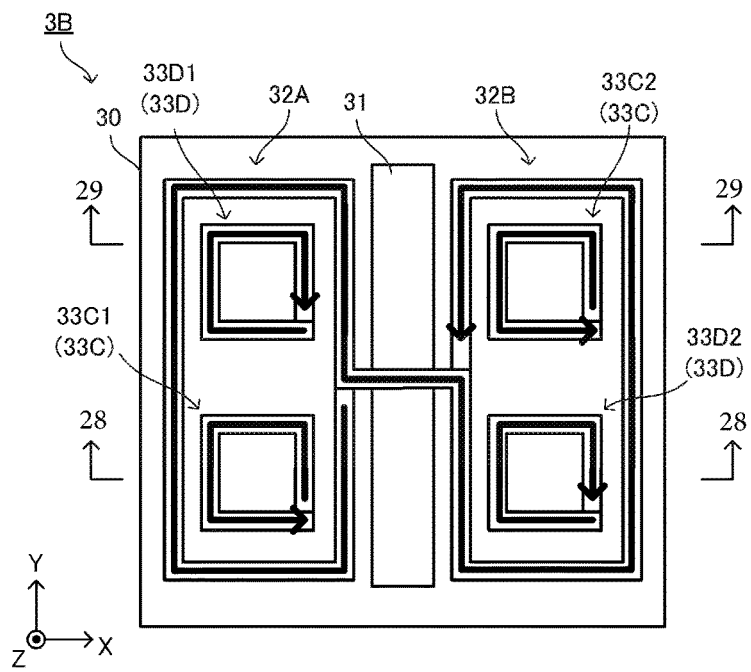
FIG. 31(A) is a plan view of an inductor module according to another example.
Figure 31B:
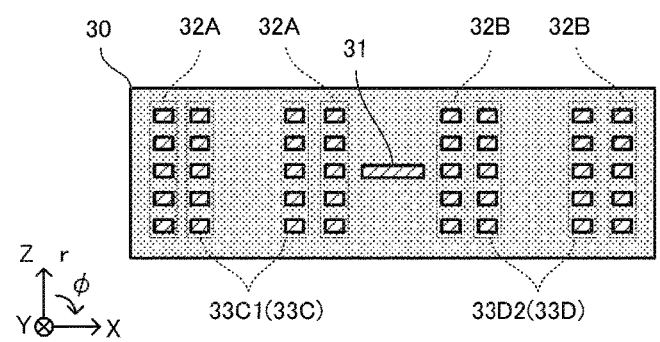
FIG. 31(B) is a cross-sectional view taken along line 28-28 in FIG. 31(A)
Figure 31C:
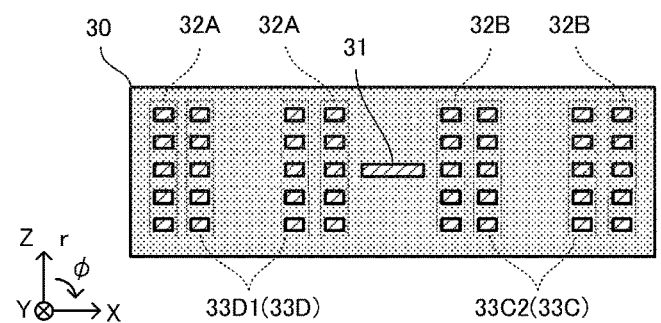
FIG. 31(C) is a cross-sectional view taken along line 29-29 in FIG. 31(A).

FIG. 31(A) is a plan view of an inductor module 3B according to another example, FIG. 31(B) is a cross-sectional view taken along line 28-28 in FIG. 31(A), and FIG. 31(C) is a cross-sectional view taken along line 29-29 in FIG. 31(A). Note that the plan view in FIG. 31(A) is a transparent view. Also, the arrows in FIG. 31(A) indicate the directions of currents flowing through two inductor elements of current detection conductors 32A and 32B, and coil conductors 33C and 33D.

The inductor module 3B differs from the inductor module 3A illustrated in FIG. 30(A) and so forth with regard to the configuration of the coil conductors 33C and 33D. The coil conductors 33C1 and 33D2 are arrayed in an orthogonal direction (X direction) as to the direction in which the current of the main line conductor 31 flows (Y direction). The coil conductors 33C2 and 33D1 are also arrayed in an orthogonal direction (X direction) as to the direction in which the current of the main line conductor 31 flows (Y direction).

In this configuration as well, the current detection conductors 32A and 32B, and the coil conductors 33C and 33D, are not magnetic coupled (or magnetic coupling is weak). Also, the main line conductor 31 and the coil conductors 33C and 33D are not magnetic coupled.

Note that the coil conductors 33C and 33D may be serially connected to form a single inductor element. In that case, the magnetic coupling between the coil conductors 33C1 and 33D1, and the magnetic coupling between the coil conductors 33C2 and 33D2 are preferably connected to increase the inductance of the coil conductors 33C and 33D, as in the modification described in FIG. 30(A). Further, with regard to the positional relationship between the coil conductors 33C1 and 33D2, the magnetic coupling between the coil conductor 33C1 and the coil conductor 33D2 is arranged so that the inductance of the coil conductors 33C1 and 33D2 is increased, by using the connection method determining the current direction the same as in the coil conductors 13 and 14 in FIG. 1. Also, with regard to the positional relationship between the coil conductors 33C2 and 33D1, the magnetic coupling between the coil conductor 33C2 and the coil conductor 33D1 is arranged so that the inductance of the coil conductors 33C2 and 33D1 is increased. Accordingly, an inductor element having even greater inductance than the modification described in FIG. 30(A) can be obtained.

Embodiment 4

Figure 32A:
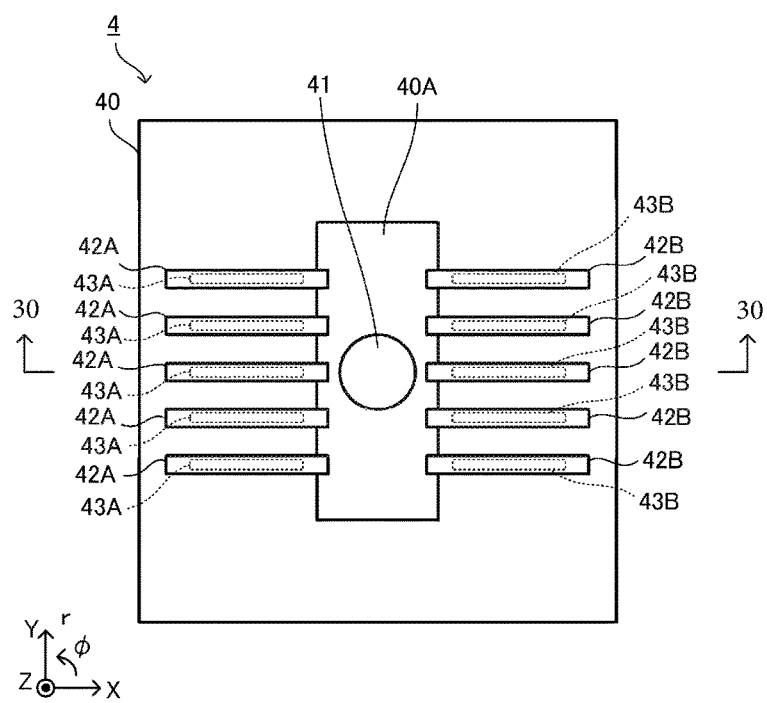
FIG. 32(A) is a plan view of an inductor module according to Embodiment 4.
Figure 32B:
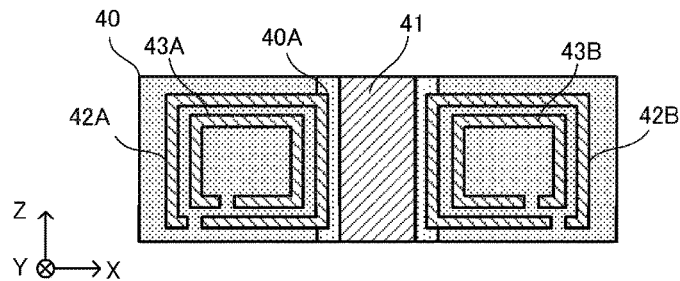
FIG. 32(B) is a cross-sectional view taken along line 30-30 in FIG. 32(A).
Figure 33:
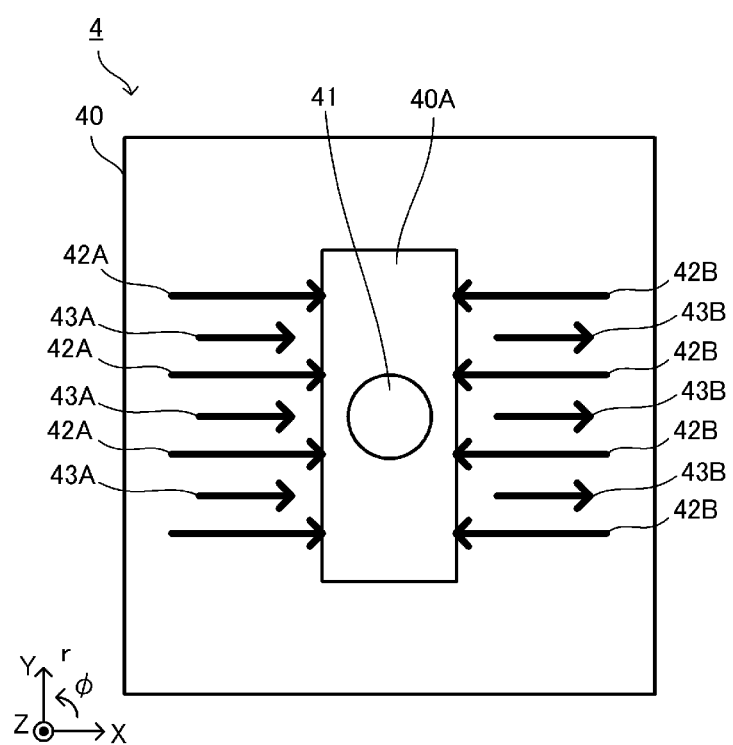
FIG. 33 is a diagram illustrating a direction of a current flowing through current detection conductors and coil conductors.

FIG. 32(A) is a plan view of an inductor module 4 according to Embodiment 4, and FIG. 32(B) is a cross-sectional view taken along line 30-30 in FIG. 32(A). Note that the plan view in FIG. 32(A) is a transparent view. FIG. 33 is a diagram illustrating the direction of current flowing through each of current detection conductors 42A and 42B, and coil conductors 43A and 43B.

The inductor module 4 has a laminate 40 formed by laminating multiple ferrite sheets, and integrally sintering the multiple ferrite sheets. A low-magnetic-permeability portion 40A that has lower magnetic permeability than the surroundings is formed in the laminate 40. A cylindrical main line conductor 41 is formed in the laminating direction (Z direction) of the low-magnetic-permeability portion 40A, and current flows through the main line conductor 41 in one direction (Z direction). Note that the main line conductor is formed by inter-layer connecting conductors such as via conductors or the like. The magnetic permeability around the main line conductor 41 is low, so the magnetic flux density near the main line conductor 41 can be made to be low, and the inductance component or magnetic loss of the main line conductor 41 can be reduced. Further, magnetic saturation around the main line conductor 41 can be prevented.

Coil-shaped current detection conductors 42A and 42B are formed in the laminate 40. The current detection conductors 42A and 42B are configured to have the winding axes thereof in an orthogonal direction (Y direction) to the laminating direction, with the winding axes of the current detection conductors 42A and 42B being parallel. The main line conductor is interposed between the current detection conductors 42A and 42B. Accordingly, in a cylindrical coordinate system with the main line conductor 41 as the axis thereof, where the direction in which the current of the main line conductor 41 flows (Z direction) is the axial direction, the winding axes of the current detection conductors 42A and 42B are in the circumferential direction (φ direction) or on a straight line (Y direction) that is tangent to the circumferential direction. The current detection conductors 42A and 42B are formed and connected such that, in plan view of the coil openings of the current detection conductors 42A and 42B, currents flowing circling in opposite directions from each other do not cancel each other out (intensify each other), and currents flowing circling in the same direction cancel each other out (weaken each other).

In a case where current flows through the main line conductor 41, magnetic flux in a direction along the circumferential direction (φ direction) is generated. Induced electromotive force is generated at the current detection conductors 42A and 42B due to current flowing through the main line conductor 41, and the induced currents generated in accordance with the induced electromotive force do not cancel each other out (intensify each other). The current flowing through the main line conductor 41 can be detected by detecting the induced current (or induced electromotive force).

Note that the magnetic coupling between the main line conductor 41 and the current detection conductors 42A and 42B is strong due to the low-magnetic-permeability portion 40A interposed between the main line conductor 41 and the current detection conductors 42A and 42B. As a result, current detection sensitivity improves.

Coil conductors 43A and 43B are formed in the laminate 40. The winding axes of the coil conductors 43A and 43B agree with the winding axes of the current detection conductors 42A and 42B, and in plan view of the coil openings of the coil conductors 43A and 43B, are located within the coil openings of the current detection conductors 42A and 42B, with the main line conductor 41 further interposed therebetween. Accordingly, in a cylindrical coordinate system with the main line conductor 41 as the axis thereof, where the direction in which the current of the main line conductor 41 flows (Y direction) is the axial direction, the winding axes of the coil conductors 43A and 43B are in the circumferential direction (φ direction) where the direction in which the current of the main line conductor 41 flows (Z direction) is the axial direction, or on a straight line (Y direction) that is tangent to the circumferential direction. The coil conductors 43A and 43B are formed and connected such that, in plan view of the coil openings of the coil conductors 43A and 43B, currents flowing circling in opposite directions from each other cancel each other out (weaken each other), and currents flowing circling in the same direction do not cancel each other out (intensify each other).

The coil conductors 43A and 43B are formed so that the couplings with the main line conductor 41 are mutually opposite with regard to polarity. For example, in a case where the coil conductor 43A and the main line conductor 41 are positively coupled (the coupling coefficient is positive), the coil conductor 43B and the main line conductor 41 are negatively coupled (the coupling coefficient is negative). Alternatively, an arrangement may be made where, in a case where the coil conductor 43A and main line conductor 41 are negatively coupled (the coupling coefficient is negative), the coil conductor 43B and the main line conductor 41 are positively coupled (the coupling coefficient is positive). Accordingly, the main line conductor 41 and the single inductor including the coil conductors 43A and 43B are not magnetically coupled (or coupling is weak).

Also, the coil conductors 43A and 43B are formed so that the couplings with the current detection conductors 42A and 42B are mutually opposite with regard to polarity. For example, in a case where the coil conductor 43A and the current detection conductor 42A are positively coupled (the coupling coefficient is positive), the coil conductor 43B and the current detection conductor 42B are negatively coupled (the coupling coefficient is negative). Alternatively, an arrangement may be made where, in a case where the coil conductor 43A and the current detection conductor 42A are negatively coupled (the coupling coefficient is negative), the coil conductor 43B and the current detection conductor 42B are positively coupled (the coupling coefficient is positive). In FIG. 32(A), in a case where current is applied to the current detection conductors 42A and 42B and the coil conductors 43A and 43B, in plan view of the coil openings of the current detection conductors 42A and 42B and coil conductors 43A and 43B, current applied to the coil conductor 43A and current detection conductor 42A flows circling in the same direction, and current applied to the coil conductor 43B and current detection conductor 42B flows circling in opposite directions from each other. Accordingly, the current detection conductors 42A and 42B and the coil conductors 43A and 43B are not magnetically coupled (or coupling is weak). Thus, the coil conductors 43A and 43B can be used as independent inductor elements.

Figure 34A:
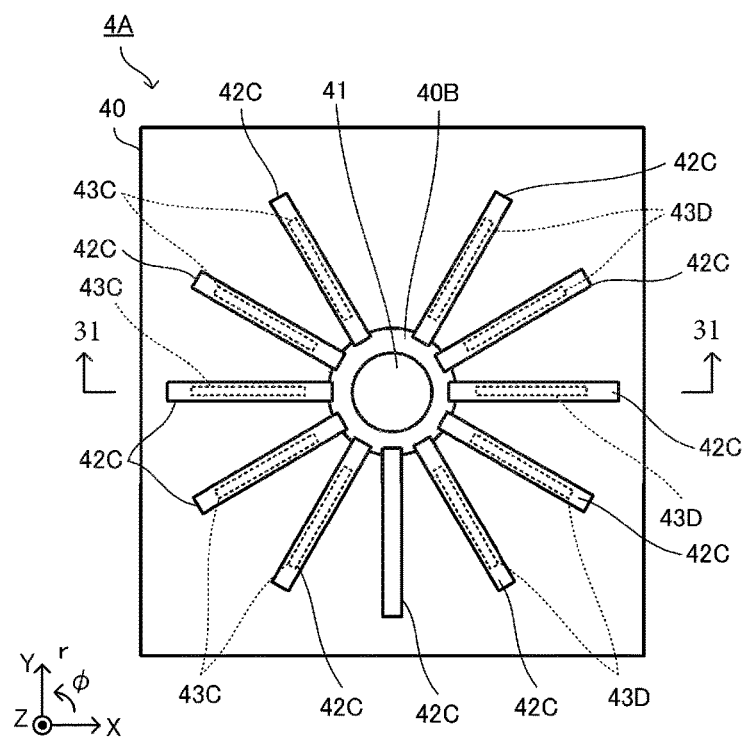
FIG. 34(A) is a plan view of an inductor module according to another example.
Figure 34B:
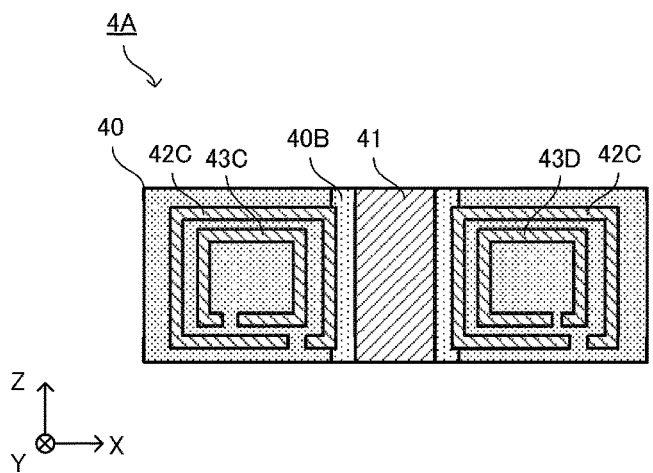
FIG. 34(B) is a cross-sectional view taken along line 31-31 in FIG. 34(A).
Figure 35:
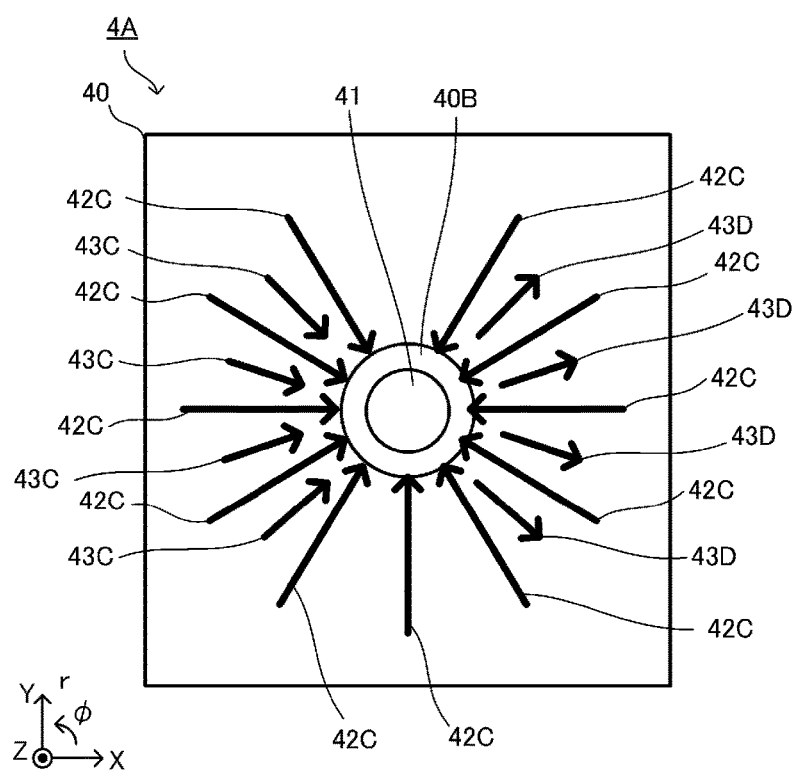
FIG. 35 is a diagram illustrating directions of currents each flowing through current detection conductors and coil conductors.

FIG. 34(A) is a plan view of an inductor module 4A according to another example, and FIG. 34(B) is a cross-sectional view taken along line 31-31 in FIG. 34(A). Note that the plan view in FIG. 34(A) is a transparent view. FIG. 35 is a diagram illustrating the direction of current flowing through current detection conductors 42C and coil conductors 43C.

A cylindrically-shaped low-magnetic-permeability portion 40B that has lower magnetic permeability than the surroundings is formed in the laminate 40 that the inductor module 4A has. The cylindrical main line conductor 41 is formed in the laminating direction (Z direction) of the low-magnetic-permeability portion 40B, and current flows through the main line conductor 41 in one direction (Z direction).

Coil-shaped current detection conductors 42C are formed in the laminate 40. The current detection conductors 42C are configured to have the winding axes thereof along the circumferential direction of the main line conductor 41, and are annular in shape. That is to say, in a cylindrical coordinate system with the main line conductor 41 as the axis thereof, where the direction in which the current of the main line conductor 41 flows (Z direction) is the axial direction, the winding axes of the current detection conductors 42C are curved lines along the circumferential direction ($\varphi$ direction).

In a case where current flows through the main line conductor 41, magnetic flux in a direction along the circumferential direction ($\varphi$ direction) is generated. Induced electromotive force is generated at the current detection conductors 42C due to the magnetic flux from the main line conductor 41. The current flowing through the main line conductor 41 can be detected by detecting the induced current (or induced electromotive force).

Coil conductors 43C and 43D are formed in the laminate 40. The winding axes of the coil conductors 43C and 43D agree with the winding axes of the current detection conductors 42C, and are located on the inner side of the current detection conductors 42C. The coil conductors 43C and 43D are laid out rotation-symmetrically with the main line conductor 41 at the center and are connected such that currents flowing through the coil conductors 43C and 43D do not cancel each other out (intensify each other), thereby forming a single inductor. Specifically, the coil conductors 43C and 43D are formed and connected such that, when viewed from one direction along the current detection conductors 42C and curved winding axes, currents flowing circling in opposite directions from each other do not cancel each other out (intensify each other), and currents flowing circling in the same direction cancel each other out (weaken each other).

The coil conductors 43C and 43D are formed so that the couplings with the main line conductor 41 are mutually opposite with regard to polarity. Accordingly, the main line conductor 41 and the single inductor including the coil conductors 43C and 43D are not magnetically coupled (or coupling is weak).

Also, the coil conductors 43C and 43D are formed so that the couplings with the current detection conductors 42C are mutually opposite with regard to polarity. For example, the configuration is such that the coil conductor 43C and the current detection conductor 42C are positively coupled (the coupling coefficient is positive), the coil conductor 43D and the current detection conductor 42C are negatively coupled (the coupling coefficient is negative). Alternatively, an arrangement may be made where the coil conductor 43C and the current detection conductor 42C are negatively coupled (the coupling coefficient is negative), the coil conductor 43D and the current detection conductor 42C are positively coupled (the coupling coefficient is positive). In FIG. 35, in a case where current is applied to the current detection conductors 42C and the coil conductors 43C and 43D, when viewed from one direction along the current detection conductors 42C and curved winding axes, applied current flows circle in the same direction through the current detection conductors 42C and coil conductors 43C. Also, applied current flows circle in the mutually opposite directions through the current detection conductors 42C and coil conductors 43D. Accordingly, the current detection conductors 42C and the coil conductors 43C and 43D are not magnetically coupled (or coupling is weak). Thus, the coil conductors 43C and 43D can be used as independent inductor elements.

Embodiment 5

Figure 36A:
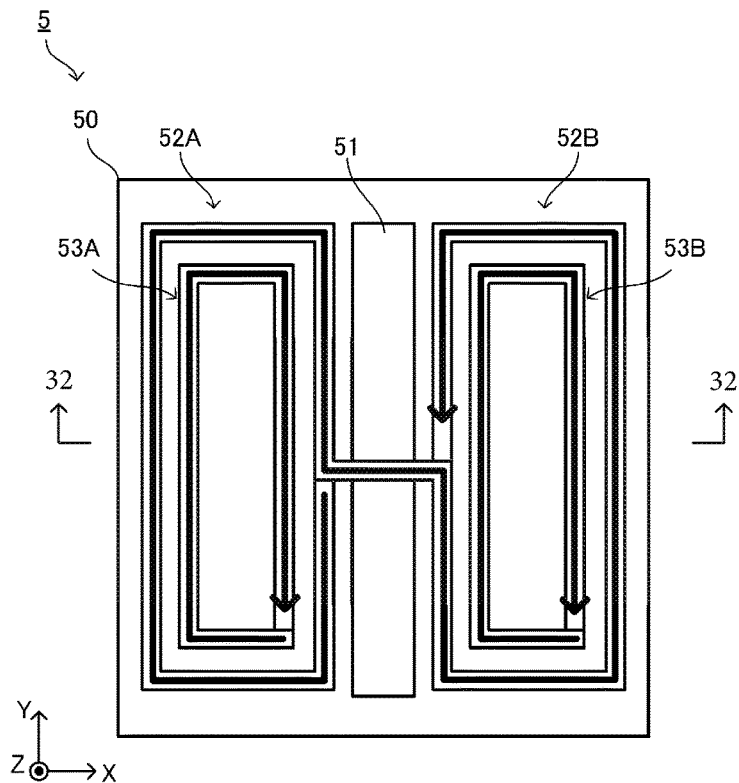
FIG. 36(A) is a plan view of an inductor module according to Embodiment 5.
Figure 36B:
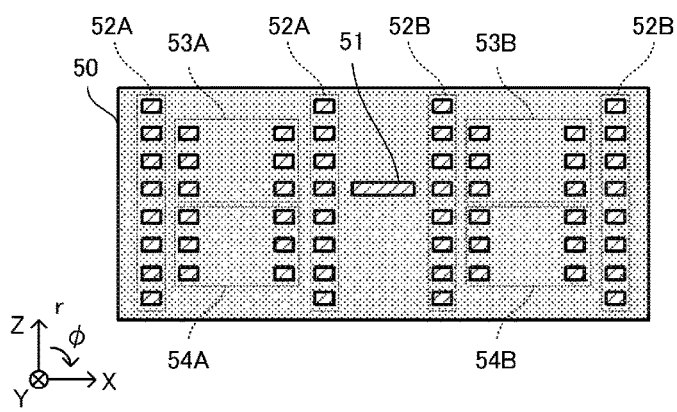
FIG. 36(B) is a cross-sectional view taken along line 32-32 in FIG. 36(A).

FIG. 36(A) is a plan view of an inductor module 5 according to Embodiment 5, and FIG. 36(B) is a cross-sectional view taken along line 32-32 in FIG. 36(A). Note that the plan view in FIG. 36(A) is a transparent view. The arrows illustrated in FIG. 36(A) represent directions of currents flowing through each of a main line conductor 51, current detection conductors 52A and 52B, and an inductor element configured of coil conductors 53A and 53B (or coil conductors 54A and 54B).

The inductor module 5 has a laminate 50 formed by laminating multiple ferrite sheets, and integrally sintering the multiple ferrite sheets. The main line conductor 51 in the form of a straight line and is long in one direction (Y direction) is formed on the main surface of one ferrite sheet in the laminate 50, and current flows in one direction (Y direction) through the main line conductor 51. The main line conductor 51 may be an arrangement where straight-line conductor patterns printed on multiple ferrite sheets are connected with each other by inter-layer connecting conductors. In this case, the inductance component and resistance component of the main line conductor 51 can be reduced.

The inductor module 5 has the current detection conductors 52A and 52B. The winding axes of the current detection conductors 52A and 52B are the laminating direction (Z direction) of the laminate 50, and the coil openings of the current detection conductors 52A and 52B are formed to sandwich the main line conductor 51 in plan view. The current detection conductors 52A and 52B are formed by open-loop conductors formed on the main surface of different layers of ferrite sheets being connected by inter-layer connection conductors (not illustrated).

Accordingly, in a cylindrical coordinate system with the main line conductor 51 as the axis thereof, where the direction in which the current of the main line conductor 51 flows (Y direction) is the axial direction, the winding axes of the current detection conductors 52A and 52B are in the circumferential direction ($\varphi$ direction) or on a straight line (Z direction) that is tangent to the circumferential direction, in the same way as in FIG. 20 and FIG. 29.

One end at the lower side (negative side in the Z direction) of the current detection conductors 52A and 52B is connected to mounting electrodes at the lower face of the laminate 50 for mounting to a motherboard. One end at the upper side (positive side in the Z direction) of the current detection conductors 52A and 52B is connected to each other. Accordingly, current detection conductors 52A and 52B form a single coil by being serially connected. The current detection conductors 52A and 52B are connected in the same way as the current detection conductors 22A and 22B described with regard to FIG. 20(A). That is to say, the current detection conductors 52A and 52B are formed and connected such that, in plan view of the coil openings of the current detection conductors 52A and 52B, currents flowing circling in opposite directions from each other do not cancel each other out (intensify each other), and currents flowing circling in the same direction cancel each other out (weaken each other). Accordingly, induced electromotive force is generated at the current detection conductors 52A and 52B due to the magnetic fluxes generated by current flowing through the main line conductor 51, and the induced currents generated in accordance with the induced electromotive force do not cancel each other out (intensify each other). The current flowing through the main line conductor 51 can be detected by detecting the induced current (or induced electromotive force).

The inductor module 5 has the coil conductors 53A, 53B, 54A and 54B. The coil conductors 53A and 53B have the same configuration as the current detection conductors 22A and 22B described with regard to FIG. 29. That is to say, the winding axes of the coil conductors 53A and 53B are in the laminating direction (Z direction) of the laminate 50, and the coil openings of the coil conductors 53A and 53B are located within the coil openings of the current detection conductors 52A and 52B and further formed to sandwich the main line conductor 51 in plan view. Accordingly, in a cylindrical coordinate system with the main line conductor 11 as the axis thereof, where the direction in which the current of the main line conductor 11 flows (Y direction) is the axial direction, the winding axes of the coil conductors 53A and 53B are in the circumferential direction (φ direction) or on a straight line (Z direction) that is tangent to the circumferential direction. The coil conductors 53A and 53B are formed and connected such that, in plan view of the coil openings of the coil conductors 53A and 53B, currents flowing circling in opposite directions from each other cancel each other out (weaken each other), and currents flowing circling in the same direction do not cancel each other out (intensify each other). The coil conductors 54A and 54B are also formed in the same way as the coil conductors 53A and 53B, and are formed overlaid with the coil conductors 53A and 53B in plan view.

Accordingly, the coil conductors 53A and 53B are formed so that the coupling between the main line conductor 51 and the coil conductor 53A and the coupling between the main line conductor 51 and the coil conductor 53B are mutually opposite with regard to polarity. Accordingly, the main line conductor 51 and the single inductor including the coil conductors 53A and 53B are not magnetically coupled (or magnetic coupling is weak). In the same way, the coil conductors 54A and 54B are formed so that the coupling with the main line conductor 51 are mutually opposite with regard to polarity. Accordingly, the main line conductor 51 and the single inductor including the coil conductors 54A and 54B are not magnetically coupled (or magnetic coupling is weak).

Also, the arrangement is formed such that the coupling between the coil conductor 53A and current detection conductor 52A, and the coupling between the coil conductor 53B and current detection conductor 52B, are mutually opposite with regard to polarity. Accordingly, the current detection conductors 52A and 52B and the single inductor including the coil conductors 53A and 53B are not magnetically coupled. Thus, the single inductor including the coil conductors 53A and 53B can be used as an independent inductor element.

Also, the arrangement is formed such that the coupling between the coil conductor 54A and current detection conductor 52A, and the coupling between the coil conductor 54B and current detection conductor 52B, are mutually opposite with regard to polarity. Accordingly, the current detection conductors 52A and 52B and the single inductor including the coil conductors 54A and 54B are not magnetically coupled. Thus, the single inductor including the coil conductors 54A and 54B can be used as an independent inductor element.

Also, the inductor module 5 can be used as a transformer, by using one of the inductor elements including the coil conductors 53A and 53B and the inductor elements including the coil conductors 54A and 54B as a primary coil, and the other as a secondary coil.

Note that all of the inductor modules described in Embodiments 1 to 5 have a laminate of ferrite sheets as a base, but this is not restrictive. A laminate of ceramic sheets that do not contain ferric oxide (e.g., ceramic sheets of alumina) may be used, or a resin base or the like may be used.

Embodiment 6

An electric power transmission system including the inductor module 5 described in Embodiment 5 will be described in this example.

Figure 37:
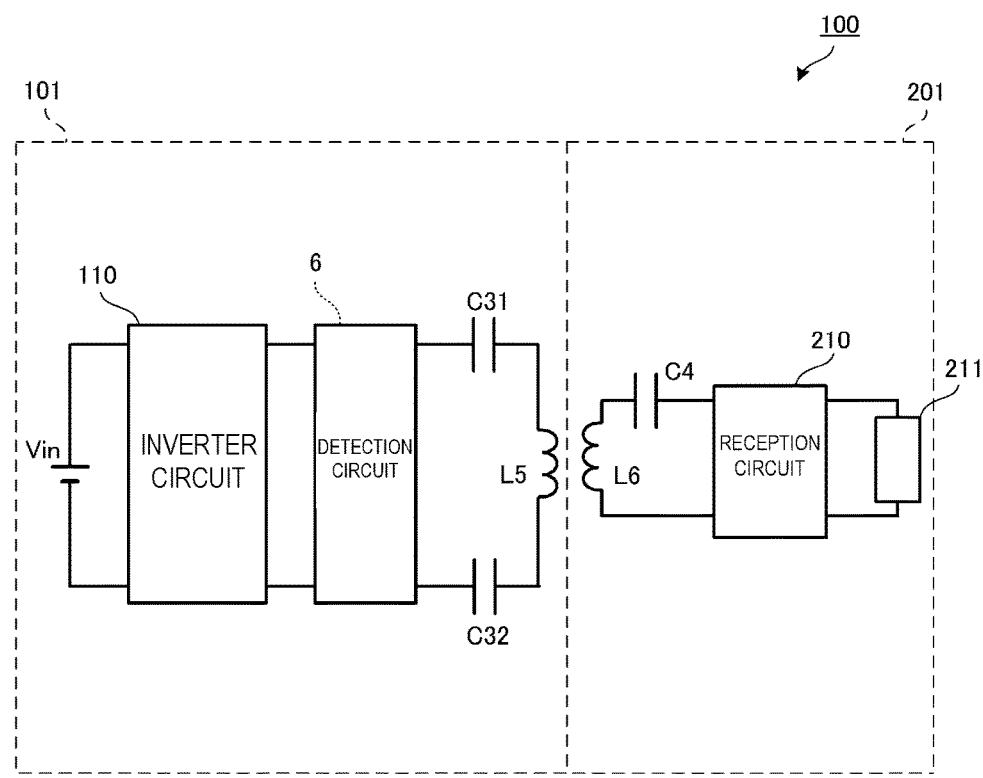
FIG. 37 is a circuit diagram of an electric power transmission system according to Embodiment 6.

FIG. 37 is a circuit diagram of an electric power transmission system 100 according to Embodiment 6. The electric power transmission system 100 has a transmission device 101 and a reception device 201.

The transmission device 101 includes an inverter circuit 110, a detection circuit 6, and a resonance circuit configured of capacitors C31 and C32 and a coil L5. The inverter circuit 110 converts DC voltage input from a DC power source Vin into AC voltage, and outputs to the resonance circuit. The detection circuit 6 detects AC current and AC voltage output from the inverter circuit 110. The detection circuit 6 will be described in detail later. The detection circuit 6 is an example of a "current detection unit" according to the present disclosure. The coil L5 is an example of a "transmission-side coupling unit" according to the present disclosure.

The reception device 201 has a resonance circuit configured of a capacitor C4 and a coil L6, a reception circuit 210, and a load 211. The coil L6 of the reception device 201 is magnetically coupled with the coil L5 of the transmission device 101. Accordingly, power is transmitted from the transmission device 101 to the reception device 201. The reception circuit 210 rectifies and smooths the voltage induced at the coil L6, and supplies to the load 211. The coil L6 is an example of a "reception-side coupling unit" according to the present disclosure.

Figure 38:
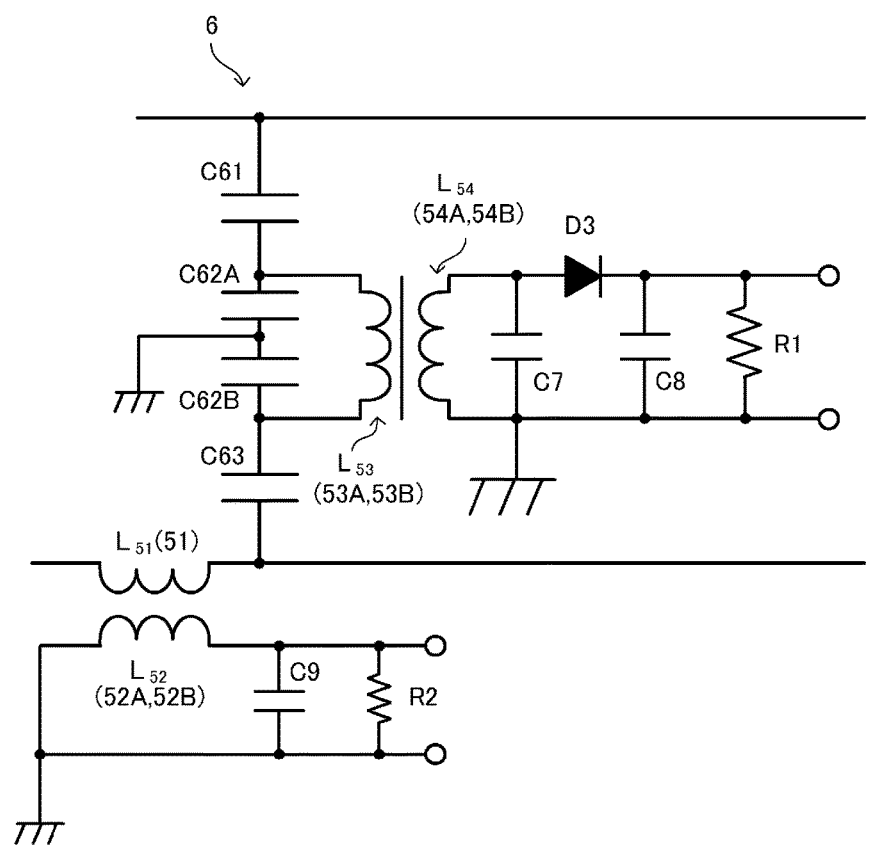
FIG. 38 is a circuit diagram of a detection circuit.

FIG. 38 is a circuit diagram of the detection circuit 6.

The detection circuit 6 has the inductor module 5 described in Embodiment 5. An inductor $L_{51}$ in FIG. 38 is the inductance component of the main line conductor 51. An inductor $L_{52}$ is the inductance component of the current detection conductors 52A and 52B. An inductor $L_{53}$ is the inductance component of the coil conductors 53A and 53B. An inductor $L_{54}$ is the inductance component of the coil conductors 54A and 54B.

Capacitors C61, C62, and C63 are connected to the differential line at the output side of the inverter circuit 110. The inductor $L_{53}$ is connected to the capacitors C62. The capacitors 62 (C62A and C62B) and the inductor $L_{53}$ make up a resonance circuit. The capacitors C61, C62, and C63 are an example of a "voltage dividing circuit" according to the present disclosure.

Capacitors C7 and C8, a diode D3, and a resistor R1 is connected to the inductor $L_{54}$. The inductor $L_{54}$ and the capacitor C7 make up a resonance circuit. The inductor $L_{54}$ is magnetically coupled with the inductor $L_{53}$. Induced current flows through the inductor $L_{54}$ due to the magnetic coupling. This induced current is rectified and smoothed by the diode D3 and capacitor C8. The current flowing through the inductor $L_{53}$ can be detected by detecting voltage at both ends of the resistor R1. From the detection results thereof, the AC voltage output from the inverter circuit 110 can be detected.

Also, the main line conductor 51 (inductor $L_{51}$) of the inductor module 5 is part of a power transmission line between the inverter circuit 110 and the coil L5. The inductor $L_{52}$ (current detection conductors 52A and 52B) are connected to a capacitor C9 and resistor R2. When current flows through the inductor $L_{52}$, induced current flows through the inductor $L_{52}$. The current flowing through the inductor $L_{51}$ (main line conductor 51), i.e., current flowing through the power transmission line between the inverter circuit 110 and the coil L5, can be detected by detecting the voltage of the load R2.

Thus, the current and voltage at the transmission device can be detected by the single inductor module 5, so the size of the device can be reduced.

The impedance when viewing the reception device 201 side from the inverter circuit 110 can be detected by detecting the current and voltage at the transmission device 101. Detecting the impedance enables whether or not the reception device 201 has been placed on the transmission device 101 to be determined, for example. In a case where the reception device 201 is placed on the transmission device 101, the resonance circuits of the transmission device 101 and reception device 201 are coupled, exhibiting a frequency peak due to complex resonance. Detecting frequency characteristics of the impedance, and detecting whether or not there is a frequency peak, enables determination of whether the reception device 201 has been placed.

Although description has been made in the present embodiment regarding a magnetic coupling type (including magnetic field resonance type) electric power transmission system, current and voltage at a transmission device can be detected in the same way with a magnetic coupling type electric power transmission system, by including the inductor module 5 described in Embodiment 5. Although the electric power transmission system including the inductor module 5 described in Embodiment 5 has been described in the present embodiment, the inductor module 5 in Embodiment 5 is not restrictive, and the electric power transmission system may have any of the inductor modules described in Embodiments 1 to 5. For example, an inductor element that an inductor module has may be used as an inductor in a filter circuit that the transmission device of the electric power transmission system has.

Also, the magnitude of impedance when viewing the reception device 201 side from the inverter circuit 110 is detected in the present embodiment by detecting the magnitude of current and voltage at the transmission device 101, but the state when viewing the reception device 201 side from the inverter circuit 110 can be comprehended in further detail by adding a function to detect the phase of the impedance. Specifically, a signal that is proportionate to AC voltage output from the inverter circuit 110 detected by the inductor $L_{52}$, and from which the DC component has been removed (hereinafter, signal 1), and a signal that is proportionate to flowing through the power transmission line detected by the inductor $L_{54}$, and from which the DC component has been removed (hereinafter, signal 2), are each input to comparators. Signal 1 and signal 2 are compared with reference voltages in the respective comparators, thereby yielding two binarized square-wave signals having a Duty ratio of approximately 50%. Inputting the two square-wave signals processed at the comparators into a phase comparison circuit yields a detection amount proportionate to the phase of the impedance. Note that the circuit constant of the detection circuit is preferably set so that the phase difference between signal 1 and signal 2 is 90°, under the condition that the phase of the impedance to be detected is zero.

The invention claimed is:

1. An inductor module, comprising:
   a current detection coil conductor magnetically coupled with a main line conductor; and
   an inductor element coil conductor,
   wherein an absolute value of a coupling coefficient between the main line conductor and the inductor element coil conductor, and an absolute value of a coupling coefficient between the current detection coil conductor and the inductor element coil conductor, are each smaller than an absolute value of a coupling coefficient between the main line conductor and the current detection coil conductor,
   wherein the main line conductor has a main portion in a shape extending in a straight line, and
   wherein the current detection coil conductor has a winding axis along a circumferential direction or a straight line that is tangent to the circumferential direction with respect to a direction in which the main portion of the main line conductor extends as an axial direction.

2. The inductor module according to claim 1,
   wherein the inductor element coil conductor has a winding axis in the axial direction or a radial direction with respect to a direction in which the main portion of the main line conductor extends as an axial direction.

3. The inductor module according to claim 1,
   wherein the inductor element coil conductor includes a first coil conductor and a second coil conductor that are connected to each other,
   wherein one of a coupling coefficient between the first coil conductor and the main line conductor, and a coupling coefficient between the second coil conductor and the main line conductor, is positive, and the other is negative, and
   wherein one of a coupling coefficient between the first coil conductor and the current detection coil conductor, and a coupling coefficient between the second coil conductor and the current detection coil conductor, is positive, and the other is negative.

4. The inductor module according to claim 1,
   wherein the current detection coil conductor includes a first detection coil conductor and a second detection coil conductor that are connected to each other,
   wherein both of a coupling coefficient between the first coil conductor and the main line conductor and a coupling coefficient between the second coil conductor and the main line conductor are positive or negative, and
   wherein one of a coupling coefficient between the first detection coil conductor and the inductor element coil conductor, and a coupling coefficient between the second detection coil conductor and the inductor element coil conductor, is positive, and the other is negative.

5. The inductor module according to claim 1,
   wherein the current detection coil conductor and the inductor element coil conductor have winding axes in a same direction, and coil openings of the current detection coil conductor and the inductor element coil conductor overlap in plan view along the winding axes.

6. The inductor module according to claim 1,
   wherein the inductor element coil conductor and the current detection coil conductor are formed on an insulator.

7. The inductor module according to claim 6,
   wherein at least part of the insulator is a magnetic substance.

8. The inductor module according to claim 6,
   wherein the main line conductor is formed on the insulator.

9. The inductor module according to claim 1,
wherein the inductor module includes two inductor element coil conductors each of which is the inductor element coil conductor, and
wherein the two inductor element coil conductors are magnetically coupled with each other.

10. An electric power transmission system comprising
a transmission-side coupling unit included in a transmission device and a reception-side coupling unit included in a reception device are coupled by at least one of an electric field and a magnetic field, and electric power is transmitted from the transmission device to the reception device,
the transmission device including
 a current detection unit detecting current flowing through an electric power transmission line connected to the transmission coupling unit,
 the current detection unit including
  a current detection coil conductor magnetically coupled with a main line conductor, and
  an inductor element coil conductor,
wherein an absolute value of a coupling coefficient between the main line conductor and the inductor element coil conductor, and an absolute value of a coupling coefficient between the current detection coil conductor and the inductor element coil conductor, are each smaller than an absolute value of a coupling coefficient between the main line conductor and the current detection coil conductor, and
wherein the main line conductor constitutes part of the electric power transmission line.

11. The electric power transmission system according to claim 10,
wherein the transmission device includes
 a voltage dividing circuit connected to the electric power transmission line,
wherein the current detection unit includes
 two inductor element coil conductors each of which is the inductor element coil conductor,
wherein the two inductor element coil conductors are magnetically coupled with each other, and
wherein one of the two inductor element coil conductors is connected to the voltage dividing circuit.

* * * * *